(12) United States Patent
Kondo et al.

(10) Patent No.: US 12,132,201 B2
(45) Date of Patent: Oct. 29, 2024

(54) NEGATIVE ELECTRODE AND METHOD FOR PRODUCING NEGATIVE ELECTRODE, AND ELECTRODE BINDING AGENT

(71) Applicant: KABUSHIKI KAISHA TOYOTA JIDOSHOKKI, Kariya (JP)

(72) Inventors: Takeshi Kondo, Kariya (JP); Tomokuni Abe, Kariya (JP); Keigo Oyaizu, Kariya (JP); Tomoyuki Tasaki, Kariya (JP); Hiroki Fujisawa, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 885 days.

(21) Appl. No.: 17/263,339

(22) PCT Filed: Jul. 10, 2019

(86) PCT No.: PCT/JP2019/027252
§ 371 (c)(1),
(2) Date: Jan. 26, 2021

(87) PCT Pub. No.: WO2020/031596
PCT Pub. Date: Feb. 13, 2020

(65) Prior Publication Data
US 2021/0280861 A1 Sep. 9, 2021

(30) Foreign Application Priority Data
Aug. 10, 2018 (JP) .................................. 2018-152102
Oct. 31, 2018 (JP) .................................. 2018-205512

(51) Int. Cl.
*H01M 4/38* (2006.01)
*H01M 4/36* (2006.01)
(Continued)

(52) U.S. Cl.
CPC ........... *H01M 4/386* (2013.01); *H01M 4/366* (2013.01); *H01M 4/622* (2013.01); *H01M 2004/027* (2013.01)

(58) Field of Classification Search
CPC ....... H01M 4/386; H01M 4/366; H01M 6/622
See application file for complete search history.

(56) References Cited

U.S. PATENT DOCUMENTS 9,437,872 B2  9/2016 Fukuchi
9,527,748 B2  12/2016 Sugiyama et al.
(Continued)

FOREIGN PATENT DOCUMENTS

JP  2014-110234 A  6/2014
JP  2015-057767 A  3/2015
(Continued)

OTHER PUBLICATIONS

International Search Report of PCT/JP2019/027252 dated Oct. 8, 2019 [PCT/ISA/210].
(Continued)

*Primary Examiner* — Olatunji A Godo
(74) *Attorney, Agent, or Firm* — Sughrue Mion, PLLC

(57) ABSTRACT

A negative electrode using a binding agent excellent in binding property, the negative electrode being capable of using water as an alternative solvent to an organic solvent during production of the negative electrode. A negative electrode including: a compound obtained through condensation of polyacrylic acid and a polyaminobenzene derivative represented by general formula (1) below and/or a self-condensation product of the polyaminobenzene derivative; a cellulose derivative; and a negative electrode active material.

6 Claims, 7 Drawing Sheets

(51) Int. Cl.
*H01M 4/62* (2006.01)
*H01M 4/02* (2006.01)

(56) References Cited

U.S. PATENT DOCUMENTS

| | | | |
|---|---|---|---|
| 9,966,607 B2 | 5/2018 | Sugiyama et al. | |
| 2009/0136845 A1* | 5/2009 | Choi | H01M 4/0414 |
| | | | 429/212 |
| 2010/0089621 A1* | 4/2010 | Stoss | B32B 17/10174 |
| | | | 156/60 |
| 2014/0154562 A1 | 6/2014 | Fukuchi | |
| 2015/0044560 A1 | 2/2015 | Ogino | |
| 2015/0050540 A1* | 2/2015 | Toduka | H01M 4/14 |
| | | | 429/136 |
| 2015/0307362 A1 | 10/2015 | Sugiyama et al. | |
| 2017/0324094 A1 | 11/2017 | Sugiyama et al. | |
| 2018/0248169 A1 | 8/2018 | Ogino | |
| 2018/0340045 A1* | 11/2018 | Rand | C08F 220/06 |
| 2019/0267608 A1* | 8/2019 | Choi | H01M 4/04 |

FOREIGN PATENT DOCUMENTS

| | | |
|---|---|---|
| JP | 2015-179625 A | 10/2015 |
| JP | 2017-123264 A | 7/2017 |
| WO | 2014/080608 A1 | 5/2014 |
| WO | 2015/098050 A1 | 7/2015 |
| WO | 2016/063882 A1 | 4/2016 |

OTHER PUBLICATIONS

Chinese Office Action dated Mar. 31, 2023 in Chinese Application No. 201980054840.7.

Communication dated Aug. 9, 2022, issued in Japanese Application No. 2018-205512.

* cited by examiner (Scheme 3)

(Scheme 4)

(Scheme 5)

NEGATIVE ELECTRODE AND METHOD FOR PRODUCING NEGATIVE ELECTRODE, AND ELECTRODE BINDING AGENT

CROSS REFERENCE TO RELATED APPLICATIONS

This application is a National Stage of International Application No. PCT/JP2019/027252, filed Jul. 10, 2019, claiming priority to Japanese Patent Application No. 2018-152102, filed Aug. 10, 2018 and Japanese Patent Application No. 2018-205512, filed Oct. 31, 2018.

TECHNICAL FIELD

The present invention relates to a negative electrode to be used in a power storage device such as a secondary battery, a method for producing the negative electrode, and an electrode binding agent.

BACKGROUND ART

In general, a power storage device such as a secondary battery includes a positive electrode, a negative electrode, and an electrolytic solution as main components. The negative electrode includes a current collector and a negative electrode active material involved in charging and discharging. In the industrial fields, increasing the capacity of power storage devices is demanded, and in order to increase the capacity of power storage devices, various technologies have been studied. As one of such specific technologies, known is a technology that adopts, as a negative electrode active material of a power storage device, an Si-containing negative electrode active material containing Si having the high occluding ability of a charge carrier such as lithium.

For example, Patent Literature 1 describes a lithium ion secondary battery including silicon as a negative electrode active material. Patent Literature 2 describes a lithium ion secondary battery including SiO as a negative electrode active material.

Patent Literature 3 describes: synthesizing a layered silicon compound of which a main component is layered polysilane in which Ca is removed by reacting $CaSi_2$ with acid; and heating the layered silicon compound at not less than 300° C. to produce a silicon material from which hydrogen is removed. Patent Literature 3 also describes a lithium ion secondary battery including the silicon material as a negative electrode active material.

The Si-containing negative electrode active material is known to expand and contract during charging and discharging. Thus, for a negative electrode including the Si-containing negative electrode active material, adopting a binding agent such as polyamide-imide or polyimide having a strong binding force is considered to be preferable. In actuality, as specific negative electrode binding agents described in Patent Literature 1 to 3, polyamide-imide or polyimide is adopted.

Patent Literature 4 indicates that a compound obtained through condensation of polyacrylic acid and a multifunctional amine is excellent as a negative electrode binding agent including an Si-containing negative electrode active material. Together with specific test results, Patent Literature 4 indicates that a lithium ion secondary battery using, as a negative electrode binding agent, a compound obtained through condensation of polyacrylic acid and 4,4'-diaminodiphenyl methane or the like was excellent in battery characteristics, when compared with a lithium ion secondary battery using polyamide-imide as a negative electrode binding agent.

Further, Patent Literature 4 indicates that polyacrylic acid and a multifunctional amine undergo condensation reaction under a heating condition of not less than 150° C. (see test 9).

In addition, Patent Literature 4 specifically indicates that a negative electrode containing a compound obtained through condensation of polyacrylic acid and a multifunctional amine was obtained using the following production method (see Example 1).

Under a condition of 130° C., an intermediate composition N-methyl-2-pyrrolidone solution containing polyacrylic acid and a multifunctional amine is produced.

↓

A negative-electrode-active-material-layer forming composition in a slurry form by using the intermediate composition N-methyl-2-pyrrolidone solution is produced.

↓

The negative-electrode-active-material-layer forming composition is applied on a negative electrode current collector, and N-methyl-2-pyrrolidone is removed.

↓

The intermediate composition is caused to undergo condensation reaction through heat treatment at 160° C. for 3 hours to form a polymer having a crosslinked structure, thereby producing a negative electrode.

CITATION LIST

Patent Literature

Patent Literature 1: JP 2015-57767 (A)
Patent Literature 2: JP 2015-179625 (A)
Patent Literature 3: WO2014/080608
Patent Literature 4: WO2016/063882

SUMMARY OF INVENTION

Technical Problem

From the viewpoint of consideration for the environment as well as cost, using a less amount of an organic solvent during production of a negative electrode is preferable, and using water as an alternative solvent to an organic solvent is considered to be preferable. However, in Patent Literature 1 to Patent Literature 4, N-methyl-2-pyrrolidone is used as a solvent for producing a negative electrode. The reason is considered as follows: the binding agent or a precursor thereof or a raw material compound thereof is soluble in N-methyl-2-pyrrolidone and has low solubility in water.

The present invention has been made in consideration of such circumstances. Objects of the present invention are: to provide a negative electrode using a binding agent excellent in binding property, the negative electrode being capable of using water as an alternative solvent to an organic solvent during production of the negative electrode; and to provide a method for producing the negative electrode. Another object of the present invention is to provide a new electrode binding agent.

Solution to Problem

The compound obtained through condensation of polyacrylic acid and a multifunctional amine described in Patent Literature 4 is excellent as a negative electrode binding agent. However, the multifunctional amine described in Patent Literature 4 has poor solubility in water, and thus, producing a negative-electrode-active-material-layer forming composition using water as a solvent is difficult in actuality.

Therefore, the present inventors arrived at adopting a water-soluble polyaminobenzene derivative in place of the multifunctional amine described in Patent Literature 4, and producing a negative electrode by using a negative-electrode-active-material-layer forming composition containing polyacrylic acid, a water-soluble polyaminobenzene derivative, a negative electrode active material, and water.

Then, the present inventors actually tried producing a negative electrode by using a negative-electrode-active-material-layer forming composition containing polyacrylic acid, a water-soluble polyaminobenzene derivative, a negative electrode active material, and water. However, aggregation occurred in the negative-electrode-active-material-layer forming composition, and thus, production of a negative electrode failed.

Thus, the present inventors produced a negative-electrode-active-material-layer forming composition to which a cellulose derivative was further added. Then, no aggregation was caused, and production of a negative electrode was successful.

Based on the findings, the present inventors completed the present invention.

A negative electrode of the present invention includes: a compound obtained through condensation of polyacrylic acid and a polyaminobenzene derivative represented by general formula (1) below and/or a self-condensation product of the polyaminobenzene derivative; a cellulose derivative; and a negative electrode active material.
[Chem. 1]

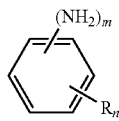

(1)

In general formula (1), R is each independently selected from alkyl optionally substituted with a substituent group, alkoxy, halogen, OH, SH, $NO_2$, CN, $CO_2H$, $SO_3H$, or $CONH_2$.

m is an integer from 2 to 6, n is an integer from 0 to 4, and m+n≤6.

A method for producing the negative electrode of the present invention includes the steps of:
  a) preparing a negative-electrode-active-material-layer forming composition containing a precursor of a compound to be obtained through condensation of polyacrylic acid and a polyaminobenzene derivative of the general formula (1) and/or a self-condensation product of the polyaminobenzene derivative, a cellulose derivative, a negative electrode active material, and water, or a negative-electrode-active-material-layer forming composition containing polyacrylic acid, a polyaminobenzene derivative represented by the general formula (1) and/or a self-condensation product of the polyaminobenzene derivative, a cellulose derivative, a negative electrode active material, and water;
  b) applying the negative-electrode-active-material-layer forming composition on a current collector to produce a negative electrode precursor; and
  c) heating the negative electrode precursor to cause condensation reaction between the polyacrylic acid and the polyaminobenzene derivative and/or the self-condensation product of the polyaminobenzene derivative to proceed.

An electrode binding agent of the present invention contains a compound obtained through condensation of polyacrylic acid and a polyaminobenzene derivative represented by the general formula (1) and/or a self-condensation product of the polyaminobenzene derivative.

Advantageous Effects of Invention

The negative electrode of the present invention includes the electrode binding agent of the present invention excellent in binding property. In the method for producing the negative electrode of the present invention, water is used as a solvent.

DESCRIPTION OF EMBODIMENTS

Figure 1:
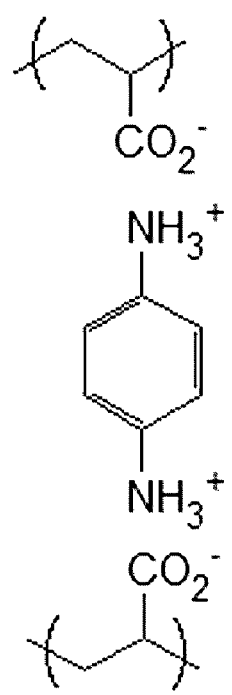
FIG. 1 shows one mode of an assumed chemical structure of a precursor of a compound to be obtained through condensation of polyacrylic acid and a polyaminobenzene derivative and/or a self-condensation product of the polyaminobenzene derivative.

The following describes embodiments of the present invention. Unless mentioned otherwise in particular, a numerical value range of "a to b" described in the present specification includes, in the range thereof, a lower limit "a" and an upper limit "b". A numerical value range is formed by arbitrarily combining such upper limit values, lower limit values, and numerical values described in Examples. In addition, numerical values arbitrarily selected within a numerical value range may be used as upper limit and lower limit numerical values.

A negative electrode of the present invention includes: a compound obtained through condensation of polyacrylic acid and a polyaminobenzene derivative represented by the general formula (1) and/or a self-condensation product of the polyaminobenzene derivative; a cellulose derivative; and a negative electrode active material.

A method for producing the negative electrode of the present invention includes the steps of:
  a) preparing a negative-electrode-active-material-layer forming composition containing a precursor of a compound to be obtained through condensation of polyacrylic acid and a polyaminobenzene derivative represented by the general formula (1) and/or a self-condensation product of the polyaminobenzene derivative, a cellulose derivative, a negative electrode active material, and water, or a negative-electrode-active-material-layer forming composition containing polyacrylic acid, a polyaminobenzene derivative represented by the general formula (1) and/or a self-condensation product of the polyaminobenzene derivative, a cellulose derivative, a negative electrode active material, and water;

b) applying the negative-electrode-active-material-layer forming composition on a current collector to produce a negative electrode precursor; and heating the negative electrode precursor to cause c) h condensation reaction between the polyacrylic acid and the polyaminobenzene derivative and/or the self-condensation product of the polyaminobenzene derivative to proceed.

An electrode binding agent of the present invention contains a compound (hereinafter, sometimes referred to as a "compound of the present invention") obtained through condensation of polyacrylic acid and a polyaminobenzene derivative represented by the general formula (1) and/or a self-condensation product of the polyaminobenzene derivative.

The electrode binding agent of the present invention may be a positive electrode binding agent or a negative electrode binding agent.

Specifically, a negative electrode of the present invention includes a current collector and, on the surface of the current collector, a negative electrode active material layer containing the compound of the present invention, a cellulose derivative, and a negative electrode active material. In the negative electrode of the present invention, the compound of the present invention functions as a binding agent.

The current collector refers to a chemically inert electronic conductor for continuously sending a flow of current to the electrode during discharging or charging of a secondary battery such as lithium ion secondary battery. The material for the current collector is not limited in particular as long as the current collector withstands a voltage suited for the active material that is used. Examples of the material for the current collector include at least one selected from silver, copper, gold, aluminum, tungsten, cobalt, zinc, nickel, iron, platinum, tin, indium, titanium, ruthenium, tantalum, chromium, or molybdenum, and metal materials such as stainless steel. The current collector may be coated with a known protective layer. One obtained by treating the surface of the current collector using a known method may be used as the current collector.

The current collector may take forms such as a foil, a sheet, a film, a line shape, a bar shape, and a mesh. Thus, as the current collector, for example, metal foils such as copper foil, nickel foil, aluminum foil, and stainless steel foil are suitably used. When the current collector is in the form of a foil, a sheet, or a film, the thickness thereof is preferably in a range of 1 μm to 100 μm.

Examples of the thickness of the negative electrode active material layer include 1 to 200 μm, 5 to 150 μm, and 10 to 100 μm.

The weight-average molecular weight of polyacrylic acid is preferably in a range of 5000 to 2500000, more preferably in a range of 10000 to 2000000, further preferably in a range of 50000 to 1800000, still more preferably in a range of 100000 to 1600000, particularly preferably in a range of 400000 to 1500000, and most preferably in a range of 500000 to 1400000.

When polyacrylic acid that is used has a greater weight-average molecular weight, the binding force tends to be grater, but the viscosity when the polyacrylic acid is dissolved in water is increased.

The viscosity of a solution obtained by dissolving polyacrylic acid in water is lower than the viscosity of a solution obtained by dissolving polyacrylic acid in N-methyl-2-pyrrolidone. Then, using water as a solvent allows adoption of a polyacrylic acid that has a greater average molecular weight, and adoption of a solution obtained by dissolving the polyacrylic acid at a higher concentration. Also in regard with these, the method for producing the negative electrode of the present invention using water as a solvent is considered to be preferable.

The polyaminobenzene derivative represented by general formula (1) is water soluble or shows water solubility in the presence of polyacrylic acid. Polyacrylic acid is soluble in water. However, the compound of the present invention is basically poorly soluble in water.

Specific examples of the polyaminobenzene derivative represented by general formula (1) include p-phenylenediamine, 2-chloro-1,4-phenylenediamine, 2,5-dichloro-1,4-phenylenediamine, 2,6-dibromo-1,4-phenylenediamine, 2,5-diaminotoluene, 2,5-dimethyl-1,4-phenylenediamine, 2-nitro-1,4-phenylenediamine, 1,4-phenylenediamine-2-sulfonic acid, 2-chloro-5-nitro-1,4-phenylenediamine, 2-chloro-5-methyl-1,4-phenylenediamine, 2,5-diamino-1,4-benzenedithiol, 2,5-diaminobenzoic acid, m-phenylenediamine, 2,4-diaminotoluene, 2,6-diaminotoluene, 1,3-phenylenediamine-4-sulfonic acid, 4-chloro-1,3-phenylenediamine, 4-methoxy-1,3-phenylenediamine, 4,6-dihydroxy-1,3-phenylenediamine, 3,5-diaminobenzoic acid, 3,5-diamino-2,4,6-trimethylbenzene sulfonic acid, 4-nitro-1,3-phenylenediamine, 2,4-diaminophenol, 4-nitro-1,2-phenylenediamine, and 1,2,4-triaminobenzene.

As the polyaminobenzene derivative represented by general formula (1), one type of compound may be adopted, or a plurality of types of compounds may be used in combination.

In the compound of the present invention, the mole ratio between an acrylic acid monomer unit and the polyaminobenzene derivative is preferably 2:1 to 50:1, more preferably 4:1 to 40:1, further preferably 7:1 to 30:1, and particularly preferably 10:1 to 25:1.

When the mole ratio of the polyaminobenzene derivative to the acrylic acid monomer is too small, suitably maintaining the capacity of the power storage device becomes difficult in some cases. When the mole ratio of the polyaminobenzene derivative to the acrylic acid monomer is too large, the binding property decreases in some cases.

In the compound of the present invention, chains of polyacrylic acid are estimated to be crosslinked with the polyaminobenzene derivative and/or a self-condensation product of the polyaminobenzene derivative.

Specifically, two carboxyl groups of adjacent acrylic acid monomer units in a first polyacrylic acid and an amino group of the polyaminobenzene derivative and/or an amino group of the self-condensation product of the polyaminobenzene derivative undergo dehydration-condensation reaction to form a six-membered cyclic imide structure. Next, another amino group of the polyaminobenzene derivative bound to the first polyacrylic acid and/or another amino group of the self-condensation product of the polyaminobenzene derivative undergo dehydration-condensation reaction with two carboxyl groups of a second polyacrylic acid, to form a six-membered cyclic imide structure, whereby a state in which the chains of the first and second polyacrylic acids are crosslinked is considered to be established.

The self-condensation product of the polyaminobenzene derivative is formed when a polyaminobenzene derivative in which, in the general formula (1), R is independently selected from $CO_2H$ or $SO_3H$, m is an integer from 2 to 5, n is an integer from 1 to 4, and m+n≤6, is used. Specifically, an amino group of a polyaminobenzene derivative and $CO_2H$ or $SO_3H$ of another polyaminobenzene derivative undergo dehydration-condensation reaction, whereby a self-condensation product is formed.

In an infrared absorption spectrum of the compound of the present invention, a peak in which a peak top is present between 1670 and 1710 $cm^{-1}$ and a peak in which a peak top is present between 1740 and 1780 $cm^{-1}$ is observed. Further, in an infrared absorption spectrum of the compound of the present invention, a peak in which a peak top is present between 1785 and 1820 $cm^{-1}$ is observed. The three peaks above are considered to be derived from C=O bonds.

Among compounds of the present invention, in a compound obtained through condensation of a self-condensation product of a polyaminobenzene derivative including $CO_2H$, a peak in which a peak top is present between 1520 and 1580 $cm^{-1}$ is observed in an infrared absorption spectrum. This peak is considered to be derived from the CONH structure in the self-condensation product of the polyaminobenzene derivative.

In the negative electrode active material layer, the compound of the present invention is, relative to the total mass of the negative electrode active material layer, preferably contained by 1 to 20 mass %, and more preferably contained by 3 to 15 mass %.

The cellulose derivative functions as an aggregation inhibitor in the negative-electrode-active-material-layer forming composition according to the method for producing the negative electrode of the present invention.

As the cellulose derivative, a cellulose derivative having a hydroxy group is particularly preferable. The cellulose derivative having a hydroxy group is expected to suitably interact with the polyacrylic acid.

The blending ratio of the cellulose derivative in the negative electrode active material layer is preferably 0.1 to 5 mass %, more preferably 0.3 to 3 mass %, and further preferably 0.5 to 2 mass %.

Examples of the cellulose derivative having a hydroxy group include: carboxyalkylcellulose such as carboxymethylcellulose and a salt thereof; hydroxyalkylcellulose such as hydroxymethylcellulose, hydroxyethylcellulose, and hydroxypropylcellulose; alkylcellulose such as methylcellulose and ethylcellulose; and hydroxyalkylalkylcellulose such as hydroxyethyl methyl cellulose and hydroxypropyl methylcellulose.

As the negative electrode active material, a material capable of occluding and releasing a charge carrier is usable. Thus, the material is not limited in particular as long as the material is an elemental substance, an alloy, or a compound capable of occluding and releasing a charge carrier such as lithium ions. For example, an elemental substance from among Li, group 14 elements such as carbon, silicon, germanium, and tin, group 1 elements such as aluminum and indium, group 12 elements such as zinc and cadmium, group 15 elements such as antimony and bismuth, alkaline earth metals such as magnesium and calcium, and group 11 elements such as silver and gold may be used as the negative electrode active material. Specific examples of the alloy or the compound include tin-based materials such as Ag—Sn alloys, Cu—Sn alloys, and Co—Sn alloys, carbon-based materials such as various graphites, silicon-based materials such as $SiO_x$ (0.35≤x≤1.6) that undergoes disproportionation into the elemental substance silicon and silicon dioxide, and a complex obtained by combining a carbon-based material with elemental substance silicon or a silicon-based material. In addition, as the negative electrode active material, an oxide such as $Nb_2O_5$, $TiO_2$, $Li_4Ti_5O_{12}$, $WO_2$, $MoO_2$, and $Fe_2O_3$, or a nitride represented by $Li_{3-x}M_xN$ (M=Co, Ni, Cu) may be used. As the negative electrode active material, one or more types described above may be used.

From the viewpoint of the possibility of increasing the capacity, examples of preferable negative electrode active materials include graphites, Si-containing materials, and Sn-containing materials. In consideration of suitable characteristics of the compound of the present invention as the binding agent, an Si-containing negative electrode active material having a high degree of expansion and contraction during charging and discharging is particularly preferable.

Specific examples of the Si-containing negative electrode active material include elemental substance Si, and $SiO_x$ (0.3≤x≤1.6) in a state of being disproportionated into two phases of Si phase and silicon oxide phase or in a state of not being disproportionated yet. The range of x is more preferably 0.5≤x≤1.5 and further preferably 0.75≤x≤1.2.

Specific examples of the Si-containing negative electrode active material include silicon materials disclosed in WO2014/080608 and the like (hereinafter, simply referred to as "silicon material").

The silicon material has a structure made up of a plurality of plate-like silicon bodies laminated in the thickness direction. The silicon material is produced through, for example, a step of synthesizing a layered silicon compound having polysilane as a main component, by reacting $CaSi_2$ and an acid, and further, a step of removing hydrogen by heating the layered silicon compound at not less than 300° C.

The method for producing the silicon material is represented by the following ideal reaction formula in the case of using hydrogen chloride as the acid.

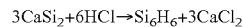

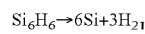

In the upper reaction of synthesizing $Si_6H_6$ which is polysilane, water is normally used as a reaction solvent from the viewpoint of removal of by-products and impurities. $Si_6H_6$ reacts with water, and thus, in the step of synthesizing the layered silicon compound including the upper reaction, the layered silicon compound is rarely produced as a compound of $Si_6H_6$ only, and is produced as a compound represented by $Si_6H_6(OH)_sX_u$ (X is a group or an element derived from the anion of the acid, s+t+u=6, 0<s<6, 0<t<6, 0<u<6). In the above chemical formula, inevitable impurities such as remaining Ca are not taken into consideration. The silicon material obtained by heating the layered silicon compound also includes oxygen and an element derived from the anion of the acid.

As described above, the silicon material has a structure made up of a plurality of plate-like silicon bodies laminated in the thickness direction. For efficient occlusion or release of a charge carrier such as lithium ions, the thickness of each plate-like silicon body is preferably in a range of 10 nm to 100 nm and more preferably in a range of 20 nm to 50 nm. The length of each plate-like silicon body in the longitudinal direction is preferably in a range of 0.1 μm to 50 μm. In addition, regarding each plate-like silicon body, (length in longitudinal direction)/(thickness) is preferably in a range of 2 to 1000. The laminated structure of the plate-like silicon bodies is confirmed by observation with a scanning electron microscope or the like. Moreover, the laminated structure is considered to be derived from the Si layer in $CaSi_2$ which is a raw material.

The silicon material preferably contains amorphous silicon and/or silicon crystallites. In particular, the above plate-like silicon bodies are preferably in a state where silicon crystallites are scattered in the amorphous silicon serving as a matrix. The size of the silicon crystallites is preferably in a range of 0.5 nm to 300 nm, more preferably in a range of 1 nm to 100 nm, further preferably in a range of 1 nm to 50 nm, and particularly preferably in a range of 1 nm to 10 nm. The size of the silicon crystallites is calculated in accordance with Scherrer's equation by using the half width of a diffraction peak of the Si (111) plane in an X-ray diffraction chart obtained from an X-ray diffraction measurement conducted on the silicon material.

The existence amounts and the sizes of the plate-like silicon bodies, the amorphous silicon, and the silicon crystallites contained in the silicon material depend mainly on the heating temperature and the heating time. The heating temperature is preferably in a range of 400° C. to 900° C. and more preferably in a range of 500° C. to 800° C.

The Si-containing negative electrode active material is preferably coated with carbon. The conductivity of the Si-containing negative electrode active material is improved by the carbon coating.

The Si-containing negative electrode active material is preferably in a powder form which is an aggregate of particles. The mean particle diameter of the Si-containing negative electrode active material is preferably in a range of 1 to 30 μm and more preferably in a range of 2 to 20 μm. The mean particle diameter in the present specification means $D_{50}$ obtained when a sample is measured by a general laser diffraction type particle size distribution measuring device.

In the negative electrode active material layer, the negative electrode active material is, relative to the total mass of the negative electrode active material layer, preferably contained by 60 to 98 mass % and more preferably contained by 70 to 95 mass %.

The negative electrode active material layer may contain another binding agent and an additive such as a conductive additive as necessary.

Examples of another binding agent include a fluorine-containing resin as such polyvinylidene fluoride, polytetrafluoroethylene, or fluororubber, a thermoplastic resin such as polypropylene or polyethylene, an imide-based resin such as polyimide or polyamide-imide, an alkoxysilyl group-containing resin, an acrylic resin such as poly(meth)acrylic acid, and styrene-butadiene rubber (SBR).

The conductive additive is added for increasing conductivity of the negative electrode. Thus, the conductive additive is preferably added optionally when conductivity of the negative electrode is insufficient, and may not necessarily be added when conductivity of the negative electrode is sufficiently good. As the conductive additive, a fine electron conductor that is chemically inert may be used, and examples thereof include carbonaceous fine particles such as carbon black, graphite, vapor grown carbon fiber, and various metal particles. Examples of the carbon black include acetylene black, KETJENBLACK (registered trademark), furnace black, and channel black. These conductive additives may be added to the negative electrode active material layer singly or in combination of two or more types of these conductive additives.

The blending ratio of the conductive additive in the negative electrode active material layer is preferably 0.1 to 20 mass %, more preferably 0.5 to 10 mass %, and further preferably 1 to 5 mass %. The mass ratio between the negative electrode active material and the conductive additive is preferably 99:1 to 85:15, more preferably 98:2 to 90:10, and particularly preferably 97:3 to 92:8.

Step a) in the method for producing the negative electrode of the present invention is described.

Step a) is a step of preparing a negative-electrode-active-material-layer forming composition containing a precursor of the compound of the present invention, a cellulose derivative, a negative electrode active material, and water; or a negative-electrode-active-material-layer forming composition containing polyacrylic acid, a polyaminobenzene derivative and/or a self-condensation product of the polyaminobenzene derivative, a cellulose derivative, a negative electrode active material, and water.

The precursor of the compound of the present invention means a state where carboxyl groups of polyacrylic acid and amino groups of a polyaminobenzene derivative and/or a self-condensation product of the polyaminobenzene derivative are in ionic bonds, but some of the carboxyl groups and the amino groups may be bound to form amide bonds and/or imide bonds.

FIG. 1 shows one mode of an assumed chemical structure of a precursor of the compound of the present invention.

The amount of water relative to the entirety of the negative-electrode-active-material-layer forming composition is preferably 20 to 80 mass % and more preferably 45 to 75 mass %.

The negative-electrode-active-material-layer forming composition is produced by mixing components. Here, the cellulose derivative functions as an aggregation inhibitor. The blending ratio of the cellulose derivative to the solid content, other than water, in the negative-electrode-active-material-layer forming composition is preferably 0.1 to 5 mass %, more preferably 0.3 to 3 mass %, and further preferably 0.5 to 2 mass %.

The precursor of the compound of the present invention is preferably formed by performing heating during production of the negative-electrode-active-material-layer forming composition. Alternatively, a mixed solution in which the precursor of the compound of the present invention has been formed as a result of heating a mixed solution obtained by mixing polyacrylic acid, a polyaminobenzene derivative, and water is preferably used in production of the negative-electrode-active-material-layer forming composition. Examples of the range of the heating temperature include 50 to 100° C., 60 to 95° C., and 70 to 90° C. A conductive additive or another additive may be blended to the negative-electrode-active-material-layer forming composition.

From the content described above, the following binding agent composition is understood.

A binding agent composition containing polyacrylic acid, a polyaminobenzene derivative represented by the general formula (1) and/or a self-condensation product of the polyaminobenzene derivative, a cellulose derivative, and water.

Alternatively, a binding agent composition containing a precursor of the compound of the present invention, a cellulose derivative, and water.

Step b) is described.

Step b) is a step of applying the negative-electrode-active-material-layer forming composition on a current collector to produce a negative electrode precursor.

Examples of the application method in step b) include methods such as roll coating method, die coating method, dip coating method, doctor blade method, spray coating method, and curtain coating method.

After the application, a heating and drying step for removing water from the negative-electrode-active-material-layer forming composition, and a pressing step of pressing the negative electrode to cause the density of the negative electrode active material layer to be appropriate may be performed. The heating and drying step and the pressing step may be performed under normal pressure or under reduced pressure.

The heating and drying step is preferably performed in a temperature range of 50 to 150° C., more preferably in a temperature range of 70 to 140° C., and further preferably in a temperature range of 80 to 130° C. When water is sufficiently distilled away in the heating and drying step, the time required in the next step c) is shortened. However, setting the temperature in the heating and drying step to a temperature exceeding 150° C. is not considered to be preferable. The reason is as follows. Step b) is assumed to be performed in a normal atmosphere, and when a temperature exceeding 150° C. is used in the heating and drying step performed as a part of step b), the current collector or the like is oxidized, whereby the strength thereof may be reduced.

Step c) is described.

Step c) is a step of heating the negative electrode precursor to cause condensation reaction between the polyacrylic acid and the polyaminobenzene derivative and/or the self-condensation product of the polyaminobenzene derivative to proceed. In step c), heating capable of causing the above-described condensation reaction to proceed is performed. Thus, although the heating mode in step c) is not limited in particular, step c) is preferably performed by applying light having a wavelength of 4 to 8 μm to the negative electrode precursor.

Light having a wavelength of 4 to 8 μm is considered to accelerate nucleophilic dehydration reaction due to the amino group of the polyaminobenzene derivative and/or the self-condensation product of the polyaminobenzene derivative with respect to the carboxyl group of the polyacrylic acid. As a result, formation of crosslinks of chains of the polyacrylic acid due to the polyaminobenzene derivative and/or the self-condensation product of the polyaminobenzene derivative is considered to be accelerated.

Light having a wavelength of 4 to 8 μm is in a wavelength range in which the light is specifically absorbed by $H_2O$ or a functional group having a carbon-oxygen double bond. In consideration of the fact that the wavelength range of the light specifically absorbed by $H_2O$ is generally 5.5 to 7 μm, and the fact that the wavelength range of the light specifically absorbed by the carbon-oxygen double bond of the carboxyl group is generally 5.5 to 7 μm, setting the wavelength of the light in step c) to 5.5 to 7 μm is considered to be preferable.

Since light having a wavelength of 4 to 8 μm corresponds to infrared light, applying light having a wavelength of 4 to 8 μm to the negative electrode precursor inevitably causes a heated state. The degree of output of light having a wavelength of 4 to 8 μm is grasped in terms of the temperature state in step c). A greater output of light having a wavelength of 4 to 8 μm is considered to increase the temperature in step c) and to cause desired nucleophilic dehydration reaction to proceed quickly.

The temperature in step c) is preferably 180 to 260° C., more preferably 185 to 250° C., further preferably 190 to 240° C., still more preferably 195 to 230° C., and particularly preferably 200 to 220° C.

When the temperature in step c) is too low, the desired reaction may not sufficiently proceed. When the temperature in step c) is too high, the dehydration reaction between carboxyl groups in chains of the polyacrylic acid excessively proceeds, i.e., acid anhydride structures are excessively produced, and thus, the function of the compound of the present invention as the binding agent may be reduced. In addition, when the temperature in step c) is excessively high, the compound of the present invention may be decomposed.

With respect to the compound of the present invention, one that has, when measurement is performed through infrared spectroscopy, a greater intensity of a peak derived from the carbonyl of the imide group than the intensity of a peak derived from the carbonyl of the acid anhydride is considered to be preferable in some cases.

In step c), the duration of applying light having a wavelength of 4 to 8 μm to an arbitrary position of the negative electrode precursor is preferably 0.5 to 10 minutes, more preferably 1 to 5 minutes, and particularly preferably 1.5 to 4 minutes. For example, when the temperature in step c) is 200° C., about 3 minutes is sufficient as the light application time in step c).

When the application time of light having a wavelength of 4 to 8 μm is too short, the desired reaction may not sufficiently proceed. When the application time of light having a wavelength of 4 to 8 μm is too long, energy is wasted, and an undesirable side reaction may be caused.

Light having a wavelength of 4 to 8 μm is capable of transmitting through a negative electrode active material layer having a thickness as described above. Thus, light having a wavelength of 4 to 8 μm is considered to reach the precursor of the compound of the present invention present on the inner side of the negative electrode active material layer, or to reach the polyacrylic acid, the polyaminobenzene derivative, and the self-condensation product of the polyaminobenzene derivative as well. Then, the desired reaction is considered to be accelerated not only on the surface of but also in the inside of the negative electrode active material layer.

In order to inhibit undesirable oxidization, step c) is preferably performed in an inert gas atmosphere. Examples of the inert gas include nitrogen, helium, and argon. After the light application, a pressing step of pressing the negative electrode to cause the density of the negative electrode active material layer to be appropriate may be performed.

In step c), using an apparatus including: a roll unwinding unit which sends out a negative electrode precursor in a roll shape; a roll winding unit by which a negative electrode is wound in a roll shape; and an irradiation unit which applies light having a wavelength of 4 to 8 μm and disposed between the roll unwinding unit and the roll winding unit, is convenient for mass production of the negative electrode.

When the apparatus is used, the negative electrode is produced under a condition that production variation is less likely to be caused, i.e., a flat negative electrode active material layer is present on a flat current collector. Thus, properties of the negative electrode after step c) are made uniform. In addition, application of light under a uniform condition is easy, and setting of the light application time is also easy. Thus, performance variation of the negative electrode is less likely to be caused. Further, increase in the production capacity and labor saving are also managed.

The negative electrode of the present invention is usable as a negative electrode of a power storage device.

Examples of the power storage device include a primary battery, a secondary battery, and a capacitor. In the following, through description of a lithium ion secondary battery as a representative example of the power storage device, a power storage device of the present invention including the negative electrode of the present invention is described.

Hereinafter, a lithium ion secondary battery including the negative electrode of the present invention is referred to as a lithium ion secondary battery of the present invention.

One mode of the lithium ion secondary battery of the present invention includes the negative electrode of the present invention, a positive electrode, and a separator, and an electrolytic solution or a solid electrolyte.

The positive electrode includes a current collector and a positive electrode active material layer formed on the surface of the current collector.

As the current collector of the positive electrode, those described for the negative electrode may be appropriately selected.

When the potential of the positive electrode is set to not less than 4 V using lithium as reference, aluminum is preferably adopted as a positive electrode current collector.

Specifically, as the positive electrode current collector, one formed from aluminum or an aluminum alloy is preferably used. Here, aluminum refers to pure aluminum, and an aluminum of which the purity is not less than 99.0% is referred to as pure aluminum. An alloy obtained by adding various elements to pure aluminum is referred to as an aluminum alloy. Examples of the aluminum alloy include those that are Al—Cu based, Al—Mn based, Al—Fe based, Al—Si based, Al—Mg based, Al—Mg—Si based, and Al—Zn—Mg based.

Specific examples of aluminum or the aluminum alloy include A1000 series alloys (pure aluminum based) such as JIS A1085, A1N30, etc., A3000 series alloys (Al—Mn based) such as JIS A3003, A3004, etc., and A8000 series alloys (Al—Fe based) such as JIS A8079, A8021, etc.

The positive electrode active material layer includes a positive electrode active material capable of occluding and releasing a charge carrier such as lithium ions, and a binding agent and a conductive additive as necessary. The positive electrode active material layer preferably contains, relative to the total mass of the positive electrode active material layer, the positive electrode active material by 60 to 99 mass %, and more preferably by 70 to 95 mass %.

Examples of the positive electrode active material include $Li_2MnO_3$ and a lithium composite metal oxide represented by a general formula of layered rock salt structure: $Li_aNi_bCo_cMn_dD_eO_f$ ($0.2 \leq a \leq 2$, $b+c+d+e=1$, $0 \leq e < 1$, D is at least one element selected from W, Mo, Re, Pd, Ba, Cr, B, Sb, Sr, Pb, Ga, Al, Nb, Mg, Ta, Ti, La, Zr, Cu, Ca, Ir, Hf, Rh, Fe, Ge, Zn, Ru, Sc, Sn, In, Y, Bi, S, Si, Na, K, P, or V, and $1.7 \leq f \leq 3$), or $Li_aNi_bCo_cAl_dD_eO_f$ ($0.2 \leq a \leq 2$, $b+c+d+e=1$, $0 \leq e \leq 1$, D is at least one element selected from Li, Fe, Cr, Cu, Zn, Ca, Mg, S, Si, Na, K, Zr, Ti, P, Ga, Ge, V, Mo, Nb, W, or La, and $1.7 \leq f \leq 3$). Additional examples of the positive electrode active material include a metal oxide having a spinel structure such as $LiMn_2O_4$, a solid solution formed from a mixture of a metal oxide having a spinel structure and a layered compound, and polyanion-based compounds represented by $LiMPO_4$, $LiMVO_4$, or $Li_2MSiO_4$ (where M is selected from at least one of Co, Ni, Mn, or Fe), or the like. Still additional examples of the positive electrode active material include tavorite-based compounds represented by $LiMPO_4F$ (M is a transition metal) such as $LiFePO_4F$ and borate-based compounds represented by $LiMBO_3$ (M is a transition metal) such as $LiFeBO_3$. Any metal oxide used as the positive electrode active material has a basic composition of the above composition formulae, and those in which a metal element included in the basic composition is substituted with another metal element are also used as the positive electrode active material. As the positive electrode active material, those that do not contain a charge carrier (for example, lithium ions contributing to the charging and discharging) may be used. For example, elemental substance sulfur, a compound that is a composite of sulfur and carbon, metal sulfides such as $TiS_2$, oxides such as $V_2O_5$ and $MnO_2$, polyaniline and anthraquinone and compounds containing such aromatics in the chemical structure, conjugate-based materials such as conjugate diacetic acid-based organic matters, and other known materials, may be used. Furthermore, a compound having a stable radical such as nitroxide, nitronyl nitroxide, galvinoxyl, and phenoxyl may be adopted as the positive electrode active material. When a material for the positive electrode active material not containing a charge carrier such as lithium is used, a charge carrier has to be added in advance to the positive electrode and/or the negative electrode using a known method. The charge carrier may be added in a state of ions, or may be added in a state of non-ions as in metal or the like. For example, when the charge carrier is lithium, a lithium foil may be, for example, attached to the positive electrode and/or the negative electrode, to be integrated therewith.

Due to high capacity, excellent durability, etc., as the positive electrode active material, a lithium composite metal oxide represented by a general formula of layered rock salt structure: $Li_aNi_bCo_cMn_dD_eO_f$ ($0.2 \leq a \leq 2$, $b+c+d+e=1$, $0 \leq e < 1$, D is at least one element selected from W, Mo, Re, Pd, Ba, Cr, B, Sb, Sr, Pb, Ga, Al, Nb, Mg, Ta, Ti, La, Zr, Cu, Ca, Ir, Hf, Rh, Fe, Ge, Zn, Ru, Sc, Sn, In, Y, Bi, S, Si, Na, K, P, or V, and $1.7 \leq f \leq 3$), or $Li_aNi_bCo_cAl_dD_eO_f$ ($0.2 \leq a \leq 2$, $b+c+d+e=1$, $0 \leq e < 1$, D is at least one element selected from Li, Fe, Cr, Cu, Zn, Ca, Mg, S, Si, Na, K, Zr, Ti, P, Ga, Ge, V, Mo, Nb, W, or La, and $1.7 \leq f \leq 3$) is preferably adopted.

In the general formula above, the values of b, c, and d are not limited in particular as long as the values satisfy the condition above. However, the values of b, c, and d preferably satisfy $0 < b < 1$, $0 < c < 1$, and $0 < d < 1$, and at least one of b, c, or d is preferably in a range of $30/100 < b < 90/100$, $10/100 < c < 90/100$, and $1/100 < d < 50/100$, more preferably in a range of $40/100 < b < 90/100$, $10/100 < c < 50/100$, and $2/100 < d < 30/100$, and further preferably in a range of $50/100 < b < 90/100$, $10/100 < c < 30/100$, and $2/100 < d < 10/100$.

As for a, e, and f, any numerical values in the corresponding ranges specified in the general formulae above may be used, and examples thereof include preferably $0.5 \leq a \leq 1.5$, $0 \leq e < 0.2$, and $1.8 \leq f \leq 2.5$, and more preferably $0.8 \leq a \leq 1.3$, $0 \leq e < 0.1$, and $1.9 \leq f \leq 2.1$.

Due to high capacity and excellent durability, etc., examples of the positive electrode active material include $Li_xMn_{2-y}A_yO_4$ having a spinel structure (A is selected from at least one element selected from Ca, Mg, S, Si, Na, K, Al, P, Ga, or Ge, and at least one type of metal element selected from transition metal elements such as Ni. $0 < x \leq 2.2$, and $0 \leq y \leq 1$). Examples of the range of the value of x include $0.5 \leq x \leq 1.8$, $0.7 \leq x \leq 1.5$, and $0.9 \leq x \leq 1.2$, and examples of the range of the value of y include $0 \leq y \leq 0.8$ and $0 \leq y \leq 0.6$. Specific examples of the compound having a spinel structure include $LiMn_2O_4$ and $LiMn_{1.5}Ni_{0.5}O_4$.

Specific examples of the positive electrode active material include $LiFePO_4$, $Li_2FeSiO_4$, $LiCoPO_4$, $Li_2CoPO_4$, $Li_2MnPO_4$, $Li_2MnSiO_4$, and $Li_2CoPO_4F$. Another specific example of the positive electrode active material is $Li_2MnO_3$—$LiCoO_2$.

As the binding agent, a known binding agent such as: a fluorine-containing resin such as polyvinylidene fluoride, polytetrafluoroethylene, or fluororubber; a thermoplastic resin such as polypropylene or polyethylene; an imide-based resin such as polyimide or polyamide-imide; an alkoxysilyl group-containing resin; carboxymethylcellulose; and styrene-butadiene rubber may be adopted.

As the conductive additive, those described for the negative electrode may be adopted.

The blending amounts of the binding agent and the conductive additive in the positive electrode active material layer are set to appropriate amounts. In order to form the positive electrode active material layer on the surface of the current collector, a known method may be adopted as appropriate.

The separator is for separating the positive electrode and the negative electrode to allow passage of lithium ions while preventing short circuit due to contact of both electrodes. As the separator, one that is known may be used. Examples of the separator include porous materials, nonwoven fabrics, and woven fabrics using one or more types of materials having electrical insulation property such as: synthetic resins such as polytetrafluoroethylene, polypropylene, polyethylene, polyimide, polyamide, polyaramide (aromatic polyamide), polyester, and polyacrylonitrile; polysaccharides such as cellulose and amylose; natural polymers such as fibroin, keratin, lignin, and suberin; and ceramics. In addition, the separator may have a multilayer structure.

The electrolytic solution contains a nonaqueous solvent and an electrolyte dissolved in the nonaqueous solvent.

As the nonaqueous solvent, cyclic carbonates, cyclic esters, linear carbonates, linear esters, ethers, or the like is used. Examples of the cyclic carbonates include ethylene carbonate, propylene carbonate, butylene carbonate, fluoroethylene carbonate, and vinylene carbonate. Examples of the cyclic esters include gamma butyrolactone, 2-methyl-gamma butyrolactone, acetyl-gamma butyrolactone, and gamma valerolactone. Examples of the linear carbonates include dimethyl carbonate, diethyl carbonate, dibutyl carbonate, dipropyl carbonate, and ethylmethyl carbonate. Examples of the linear esters include propionic acid alkyl esters, malonic acid dialkyl esters, and acetic acid alkyl esters. Examples of the ethers include tetrahydrofuran, 2-methyltetrahydrofuran, 1,4-dioxane, 1,2-dimethoxyethane, 1,2-diethoxyethane, and 1,2-dibutoxyethane. As the nonaqueous solvent, compounds in which part or all of hydrogens in the chemical structure of the specific solvents are substituted with fluorine may be adopted.

Examples of the electrolyte include lithium salts such as $LiClO_4$, $LiAsF_6$, $LiPF_6$, $LiBF_4$, $LiCF_3SO_3$, $LiN(CF_3SO_2)_2$, and $LiN(FSO_2)_2$.

Examples of the electrolytic solution include solutions prepared by dissolving a lithium salt in a nonaqueous solvent such as fluoroethylene carbonate, ethylene carbonate, dimethyl carbonate, ethylmethyl carbonate, or diethyl carbonate, at a concentration of about 0.5 mol/L to 3 mol/L and preferably 1.5 mol/L to 2.5 mol/L.

As the solid electrolyte, one that is usable as a solid electrolyte of a lithium ion secondary battery may be adopted as appropriate.

One mode of a specific method for producing the lithium ion secondary battery of the present invention is described.

For example, an electrode assembly is formed by sandwiching the separator between the positive electrode and the negative electrode. The electrode assembly may be a laminated type obtained by stacking the positive electrode, the separator, and the negative electrode, or a wound type obtained by winding a laminated body of the positive electrode, the separator, and the negative electrode. The lithium ion secondary battery is preferably formed by respectively connecting, using current collecting leads or the like, the positive electrode current collector to a positive electrode external connection terminal and the negative electrode current collector to a negative electrode external connection terminal, and then adding the electrolytic solution to the electrode assembly.

The form of the lithium ion secondary battery of the present invention is not limited in particular, and various forms such as a cylindrical type, a square type, a coin type, a laminated type, etc., are adopted.

The lithium ion secondary battery of the present invention may be mounted on a vehicle. The vehicle may be a vehicle that uses, as all or a part of the source of power, electrical energy obtained from the lithium ion secondary battery, and examples thereof include electric vehicles and hybrid vehicles. When the lithium ion secondary battery is to be mounted on the vehicle, a plurality of the lithium ion secondary batteries may be connected in series to form an assembled battery. Other than the vehicles, examples of instruments on which the lithium ion secondary battery may be mounted include various home appliances, office instruments, and industrial instruments driven by a battery such as personal computers and portable communication devices. In addition, the lithium ion secondary battery of the present invention may be used as power storage devices and power smoothing devices for wind power generation, photovoltaic power generation, hydroelectric power generation, and other power systems, power supply sources for auxiliary machineries and/or power of ships, etc., power supply sources for auxiliary machineries and/or power of aircraft and spacecraft, etc., auxiliary power supply for vehicles that do not use electricity as a source of power, power supply for movable household robots, power supply for system backup, power supply for uninterruptible power supply devices, and power storage devices for temporarily storing power required for charging at charge stations for electric vehicles.

Although embodiments of the present invention have been described above, the present invention is not limited to the embodiments. Without departing from the gist of the present invention, the present invention is implemented in various modes with modifications and improvements, etc., that are made by a person skilled in the art.

EXAMPLES

In the following, the present invention is more specifically described by presenting Examples, Comparative Examples, and the like. The present invention is not limited to these Examples.

Example 1

A polyacrylic acid having a weight-average molecular weight of 100000 was dissolved in water, to produce a polyacrylic acid aqueous solution in which the polyacrylic acid was contained by 10 mass %. In addition, p-phenylenediamine was dissolved in water to produce a p-phenylenediamine aqueous solution. Under a stirring condition, the p-phenylenediamine aqueous solution was dropped into the polyacrylic acid aqueous solution, and the obtained mixture was stirred at room temperature for 30 minutes. Then, the mixture was stirred at 80° C. for 2 hours, to produce a solution of Example 1.

In the solution of Example 1, the mole ratio between the acrylic acid monomer and the p-phenylenediamine corresponds to 16:1.

Step a)

84 parts by mass of SiO coated with carbon as an Si-containing negative electrode active material, 5 parts by mass of acetylene black as a conductive additive, the solution of Example 1, as a binding agent, in an amount that realizes 10 parts by mass of the solid content, 1 part by mass of carboxymethylcellulose, and an appropriate amount of water were mixed, to produce a negative-electrode-active-material-layer forming composition in a slurry form. The proportion of the solid content, other than water, in the negative-electrode-active-material-layer forming composition was 40 mass %.

Step b)

As a negative electrode current collector, an electrolysis Cu foil having a thickness of 30 μm and wound in a roll shape was prepared.

A negative electrode precursor production apparatus including: a roll unwinding unit which sends out a current collector; a roll winding unit by which a negative electrode precursor is wound in a roll shape; an application unit which is disposed between the roll unwinding unit and the roll winding unit and which applies a negative-electrode-active-material-layer forming composition in a film form; a drying unit disposed between the application unit and the roll winding unit; and a pressing unit disposed between the drying unit and the roll winding unit, was prepared.

The negative electrode current collector and the negative-electrode-active-material-layer forming composition were supplied to the apparatus, and a negative electrode precursor was produced in a normal atmosphere. The drying temperature in the drying unit was 60° C. The thickness of the negative electrode active material layer in the negative electrode precursor was 20 μm.

Step c)

An apparatus including: a roll unwinding unit which sends out a negative electrode precursor in a roll shape; a roll winding unit by which a negative electrode is wound in a roll shape; and an irradiation unit which is disposed between the roll unwinding unit and the roll winding unit and which applies light having a wavelength of 6 μm, was prepared. In the apparatus, the path in which the negative electrode precursor was irradiated with light was in a nitrogen gas atmosphere.

The output of light having a wavelength of 6 μm was set such that the temperature of the irradiation unit was 200° C. The roll winding speed was set such that the time during which the light was applied to an arbitrary position of the negative electrode precursor was 3 minutes.

The negative electrode precursor obtained in step b) was set in the above apparatus, and the apparatus was operated under the above-described condition, whereby a negative electrode of Example 1 was produced.

<Production of Lithium Ion Secondary Battery>

The negative electrode of Example 1 was cut into a circular shape having a diameter of 11 mm, to obtain an evaluation electrode. A metal lithium foil having a thickness of 500 μm was cut into a circular shape having a diameter of 13 mm, to obtain a counter electrode. As the separator, a glass filter (Hoechst Celanese) and Celgard 2400 (Polypore Inc.), which was a monolayer polypropylene, were prepared. An electrolytic solution in which $LiPF_6$ was dissolved at 1 mol/L in a mixed solvent obtained by mixing ethylene carbonate and diethyl carbonate at a volume ratio of 1:1 was prepared. The two types of separators were sandwiched between the counter electrode and the evaluation electrode in the order of the counter electrode, the glass filter, the Celgard 2400, and the evaluation electrode, to obtain an electrode assembly. The electrode assembly was housed in a coin type battery case CR2032 (Hohsen Corp.), and further, the electrolytic solution was injected, whereby a coin type battery was obtained. The coin type battery was used as a lithium ion secondary battery of Example 1.

Example 2

A solution, a negative electrode, and a lithium ion secondary battery of Example 2 were produced using a method similar to that in Example 1 except that a polyacrylic acid having a weight-average molecular weight of 400000 was used.

Example 3

A solution, a negative electrode, and a lithium ion secondary battery of Example 3 were produced using a method similar to that in Example 1 except that a polyacrylic acid having a weight-average molecular weight of 800000 was used.

Example 4

A negative electrode and a lithium ion secondary battery of Example 4 were produced using a method similar to that in Example 3 except that step a) was set as follows.

Step a)

88 parts by mass of SiO coated with carbon as an Si-containing negative electrode active material, 4 parts by mass of acetylene black as a conductive additive, the solution of Example 3, as a binding agent, in an amount that realizes 7 parts by mass of the solid content, 1 part by mass of carboxymethylcellulose, and an appropriate amount of water were mixed, to produce a negative-electrode-active-material-layer forming composition in a slurry form.

Example 5

A solution, a negative electrode, and a lithium ion secondary battery of Example 5 were produced using a method similar to that in Example 3 except that 3,5-diaminobenzoic acid was used instead of p-phenylenediamine.

Example 6

A solution, a negative electrode, and a lithium ion secondary battery of Example 6 were produced using a method similar to that in Example 3 except that 2,5-diaminotoluene was used instead of p-phenylenediamine.

Example 7

A solution, a negative electrode, and a lithium ion secondary battery of Example 7 were produced using a method similar to that in Example 3 except that 2-nitro-1,4-phenylenediamine was used instead of p-phenylenediamine.

Example 8

A solution, a negative electrode, and a lithium ion secondary battery of Example 8 were produced using a method similar to that in Example 3 except that m-phenylenediamine was used instead of p-phenylenediamine.

Example 9

A solution, a negative electrode, and a lithium ion secondary battery of Example 9 were produced using a method similar to that in Example 3 except that the mole ratio between the acrylic acid monomer and p-phenylenediamine in the solution of Example 3 was 4:1.

Example 10

A solution, a negative electrode, and a lithium ion secondary battery of Example 10 were produced using a method similar to that in Example 3 except that the mole ratio between the acrylic acid monomer and p-phenylenediamine in the solution of Example 3 was 1:1.

Example 11

A solution, a negative electrode, and a lithium ion secondary battery of Example 11 were produced using a method similar to that in Example 3 except that the mole ratio between the acrylic acid monomer and p-phenylenediamine in the solution of Example 3 was 1:2.

Example 12

In step c), a negative electrode and a lithium ion secondary battery of Example 12 were produced using a method similar to that in Example 3 except that the output of light having a wavelength of 6 μm was set such that the temperature of the irradiation unit was 230° C.

Comparative Example 1

Production of a negative electrode of Comparative Example 1 was attempted using a method similar to that in Example 3 except that carboxymethylcellulose was not used in step a). However, the negative-electrode-active-material-layer forming composition was aggregated and thus, the steps of step b) and thereafter were not able to be performed.

Based on production results of each Example and Comparative Example 1, the necessity of a cellulose derivative such as carboxymethylcellulose in the method for producing the negative electrode of the present invention using water as the solvent for the negative-electrode-active-material-layer forming composition, is considered to have been confirmed.

Comparative Example 2

A negative electrode and a lithium ion secondary battery of Comparative Example 2 were produced using a method similar to that in Example 3 except that the following heating step was performed as step c).
Heating Step:
A negative electrode precursor wound in a roll shape was set in a vacuum heating oven, and was heated at 120° C. for 8 hours in a reduced pressure atmosphere, whereby a negative electrode of Comparative Example 2 was produced.

Comparative Example 3

A negative electrode and a lithium ion secondary battery of Comparative Example 3 were produced using a method similar to that in Example 3 except that the following heating step was performed as step c).
Heating Step:
A negative electrode precursor wound in a roll shape was set in a vacuum heating oven, and was heated at 150° C. for 8 hours in a reduced pressure atmosphere, whereby a negative electrode of Comparative Example 3 was produced.

Reference Example 1

A polyacrylic acid having a weight-average molecular weight of 100000 was dissolved in N-methyl-2-pyrrolidone, to produce a polyacrylic acid solution in which the polyacrylic acid was contained by 10 mass %. In addition, 4,4'-diaminodiphenyl methane was dissolved in N-methyl-2-pyrrolidone to produce a 4,4'-diaminodiphenyl methane solution. Under a stirring condition, the 4,4'-diaminodiphenyl methane solution was dropped into the polyacrylic acid solution, and the obtained mixture was stirred at room temperature for 30 minutes. Then, using a Dean-Stark apparatus, the mixture was stirred at 110° C. for 2 hours to produce a solution of Reference Example 1.

In the solution of Reference Example 1, the mole ratio between the acrylic acid monomer and 4,4'-diaminodiphenyl methane corresponds to 16:1.
Step a)
85 parts by mass of SiO coated with carbon as an Si-containing negative electrode active material, 5 parts by mass of acetylene black as a conductive additive, the solution of Reference Example 1, as a binding agent, in an amount that realizes 10 parts by mass of the solid content, and an appropriate amount of N-methyl-2-pyrrolidone were mixed, to produce a negative-electrode-active-material-layer forming composition in a slurry form.

Then, using a method similar to that in Example 1, a negative electrode and a lithium ion secondary battery of Reference Example 1 were produced.

Reference Example 2

A polyacrylic acid having a weight-average molecular weight of 100000 was dissolved in N-methyl-2-pyrrolidone, to produce a polyacrylic acid solution in which the polyacrylic acid was contained by 10 mass %. In addition, p-phenylenediamine was dissolved in N-methyl-2-pyrrolidone to produce a p-phenylenediamine solution. Under a stirring condition, the p-phenylenediamine solution was dropped into the polyacrylic acid solution, and the obtained mixture was stirred at room temperature for 30 minutes. Then, using a Dean-Stark apparatus, the mixture was stirred at 110° C. for 2 hours to produce a solution of Reference Example 2.

In the solution of Reference Example 2, the mole ratio between the acrylic acid monomer and p-phenylenediamine corresponds to 16:1.

Then, a negative electrode and a lithium ion secondary battery of Reference Example 2 were produced using a method similar to that in Reference Example 1 except that the solution of Reference Example 2 was used.

In Reference Example 1 and Reference Example 2 each using N-methyl-2-pyrrolidone as the solvent for the negative-electrode-active-material-layer forming composition, the negative-electrode-active-material-layer forming composition was produced without using a cellulose derivative.

Based on production results of each Example, Comparative Example 1, Reference Example 1, and Reference Example 2, a cellulose derivative serving as an aggregation inhibitor is considered to be necessary when the solvent for the negative-electrode-active-material-layer forming composition is water, and a cellulose derivative serving as an aggregation inhibitor is considered to be unnecessary when the solvent for the negative-electrode-active-material-layer forming composition is N-methyl-2-pyrrolidone.

Reference Example 3

A negative electrode and a lithium ion secondary battery of Reference Example 3 were produced using a method similar to that in Reference Example 1 except that an N-methyl-2-pyrrolidone solution of polyamide-imide was used instead of the solution of Reference Example 1.

Reference Example 4

A negative electrode and a lithium ion secondary battery of Reference Example 4 were produced using a method similar to that in Reference Example 1 except that an N-methyl-2-pyrrolidone solution of a polyacrylic acid having a weight-average molecular weight of 100000 was used instead of the solution of Reference Example 1.

Table 1 shows a list of the negative electrodes of Example 1 to Example 12, Comparative Example 1 to Comparative Example 3, and Reference Example 1 to Reference Example 4.

In Table 1, NMP is an abbreviation of N-methyl-2-pyrrolidone.

"Composition" means the mass ratio between negative electrode active material/conductive additive/compound of the present invention/carboxymethylcellulose. However, the composition of Reference Example 3 means the mass ratio between negative electrode active material/conductive additive/polyamide-imide/carboxymethylcellulose. The composition of Reference Example 4 means the mass ratio between negative electrode active material/conductive additive/polyacrylic acid/carboxymethylcellulose.

"PAA" is an abbreviation of polyacrylic acid. "Mole ratio" means the mole ratio between the acrylic acid monomer and a polyaminobenzene derivative in the compound of the present invention.

"Light application" means light application at a wavelength of 6 μm in step c).

TABLE 1

| | Solvent | Composition | PAA molecular weight | Amine | Mole ratio | Light application Heating temperature Heating time |
|---|---|---|---|---|---|---|
| Example 1 | water | 84/5/10/1 | 100000 | p-phenylenediamine | 16:1 | Performed 200° C. 3 minutes |
| Example 2 | water | 84/5/10/1 | 400000 | p-phenylenediamine | 16:1 | Performed 200° C. 3 minutes |
| Example 3 | water | 84/5/10/1 | 800000 | p-phenylenediamine | 16:1 | Performed 200° C. 3 minutes |
| Example 4 | water | 88/4/7/1 | 800000 | p-phenylenediamine | 16:1 | Performed 200° C. 3 minutes |
| Example 5 | water | 84/5/10/1 | 800000 | 3,5-diaminobenzoic acid | 16:1 | Performed 200° C. 3 minutes |
| Example 6 | water | 84/5/10/1 | 800000 | 2,5-diaminotoluene | 16:1 | Performed 200° C. 3 minutes |
| Example 7 | water | 84/5/10/1 | 800000 | 2-nitro-1,4-phenylenediamine | 16:1 | Performed 200° C. 3 minutes |
| Example 8 | water | 84/5/10/1 | 800000 | m-phenylenediamine | 16:1 | Performed 200° C. 3 minutes |
| Example 9 | water | 84/5/10/1 | 800000 | p-phenylenediamine | 4:1 | Performed 200° C. 3 minutes |
| Example 10 | water | 84/5/10/1 | 800000 | p-phenylenediamine | 1:1 | Performed 200° C. 3 minutes |
| Example 11 | water | 84/5/10/1 | 800000 | p-phenylenediamine | 1:2 | Performed 200° C. 3 minutes |
| Example 12 | water | 84/5/10/1 | 800000 | p-phenylenediamine | 16:1 | Performed 230° C. 3 minutes |
| Comparative Example 1 | water | 84/5/10/0 | 800000 | p phenylenediamine | 16:1 | — |
| Comparative Example 2 | water | 84/5/10/1 | 800000 | p-phenylenediamine | 16:1 | Not performed 120° C. 8 hours |
| Comparative Example 3 | water | 84/5/10/1 | 800000 | p-phenylenediamine | 16:1 | Not performed 150° C. 8 hours |
| Reference Example 1 | NMP | 85/5/10/0 | 100000 | 4,4'-diaminodiphenyl methane | 16:1 | Performed 200° C. 3 minutes |

TABLE 1-continued

| | Solvent | Composition | PAA molecular weight | Amine | Mole ratio | Light application Heating temperature Heating time |
|---|---|---|---|---|---|---|
| Reference Example 2 | NMP | 85/5/10/0 | 100000 | p-phenylenediamine | 16:1 | Performed 200° C. 3 minutes |
| Reference Example 3 | NMP | 85/5/10/0 | | polyamide-imide was used | | Performed 200° C. 3 minutes |
| Reference Example 4 | NMP | 85/5/10/0 | 100000 | none | — | Performed 200° C. 3 minutes |

Evaluation Example 1

Using a tension tester, the peel strengths of the negative electrodes of Example 1 to Example 12, Comparative Example 2 and Comparative Example 3, and Reference Example 1 to Reference Example 4 were measured. The test method was according to JIS Z 0237. Specifically, in the test, each negative electrode was adhered by an adhesive tape to a base, with the negative electrode active material layer side oriented downward, and then, the negative electrode was pulled upward at an angle of 90 degrees, whereby the peel strength was measured. Table 2 to Table 7 show the results of the peel strengths, together with the composition and the production method of each negative electrode.

TABLE 2

| | Solvent | Composition | Amine | Peel strength (N/cm) |
|---|---|---|---|---|
| Example 1 | water | 84/5/10/1 | p-phenylenediamine | 0.31 |
| Reference Example 1 | NMP | 85/5/10/0 | 4,4'-diaminodiphenyl methane | 0.3 |
| Reference Example 2 | NMP | 85/5/10/0 | p-phenylenediamine | 0.33 |

In each of the negative electrodes of Example 1, Reference Example 1, and Reference Example 2, the polyacrylic acid used had a weight-average molecular weight of 100000, and the mole ratio between the acrylic acid monomer and the amine was 16:1. The negative electrodes of Example 1, Reference Example 1, and Reference Example 2 were each produced by performing step c) under the same condition.

The negative electrode of Example 1 using water as the solvent and containing carboxymethylcellulose is considered to have a peel strength equivalent to or higher than that of the negative electrodes of Reference Example 1 and Reference Example 2 each using N-methyl-2-pyrrolidone as the solvent and not containing carboxymethylcellulose.

TABLE 3

| | PAA molecular weight | Peel strength (N/cm) |
|---|---|---|
| Example 1 | 100000 | 0.31 |
| Example 2 | 400000 | 0.41 |
| Example 3 | 800000 | 0.56 |

The negative electrodes of Example 1 to Example 3 are different in the weight-average molecular weight of the polyacrylic acid used. Use of a polyacrylic acid having a large weight-average molecular weight is considered to increase the peel strength.

TABLE 4

| | Composition | Polyaminobenzene derivative | Peel strength (N/cm) |
|---|---|---|---|
| Example 3 | 84/5/10/1 | p-phenylenediamine | 0.56 |
| Example 4 | 88/4/7/1 | p-phenylenediamine | 0.4 |
| Example 5 | 84/5/10/1 | 3, 5-diaminobenzoic acid | 0.51 |
| Example 6 | 84/5/10/1 | 2, 5-diaminotoluene | 0.3 |
| Example 7 | 84/5/10/1 | 2-nitro-1, 4-phenylenediamine | 0.31 |
| Example 8 | 84/5/10/1 | m-phenylenediamine | 0.31 |

In each of the negative electrodes of Example 3 to Example 8, the weight-average molecular weight of the polyacrylic acid used was 800000, and the mole ratio between the acrylic acid monomer and the polyaminobenzene derivative was 16:1. The negative electrodes of Example 3 to Example 8 were each produced by performing step c) under the same condition.

The peel strength is understood to change depending on the blending ratio of the compound of the present invention and the type of the polyaminobenzene derivative.

TABLE 5

| | Mole ratio | Peel strength (N/cm) |
|---|---|---|
| Example 3 | 16:1 | 0.56 |
| Example 9 | 4:1 | 0.19 |
| Example 10 | 1:1 | Could not be measured |
| Example 11 | 1:2 | Could not be measured |

The negative electrodes of Example 3 and Example 9 to Example 11 are different in the mole ratio between the acrylic acid monomer and the polyaminobenzene derivative.

As for the negative electrodes of Example 10 and Example 11, peeling was observed immediately after the measurement was started. Thus, the value of the peel strength could not be measured. In terms of the peel strength, as for the mole ratio between the acrylic acid monomer a polyaminobenzene derivative, a larger value of the acrylic acid monomer is considered to be preferable.

TABLE 6

| | Light application Heating temperature, Heating time | Peel strength (N/cm) |
|---|---|---|
| Example 3 | Performed 200° C., 3 minutes | 0.56 |
| Example 12 | Performed 230° C., 3 minutes | 0.33 |
| Comparative Example 2 | Not performed 120° C., 8 hours | 0.25 |
| Comparative Example 3 | Not performed 150° C., 8 hours | 0.26 |

The negative electrodes of Example 3, Example 12, Comparative Example 2, and Comparative Example 3 are different in the heating condition and in whether or not application of light at a wavelength of 6 μm in step c) was performed.

Based on the results of Example 3 and Example 12, the dehydration-condensation reaction between carboxyl groups of chains of the polyacrylic acid are estimated to have excessively proceeded by a little under the condition of 230 C° and light application for 3 minutes of Example 12. Therefore, when the application time of light to the negative electrode precursor in step c) is 3 minutes, setting the output of light such that the temperature becomes about 200° C. is considered to be preferable.

The negative electrodes of Comparative Example 2 and Comparative Example 3 were each produced by being heated at a relatively low temperature and for a long time in order to inhibit excessive dehydration-condensation reaction between carboxyl groups of chains of the polyacrylic acid, using a heating method not adopting application of light having a wavelength of 6 μm.

With respect to the negative electrodes of Comparative Example 2 and Comparative Example 3, the peel strength is understood to be small. The dehydration-condensation reaction between the polyacrylic acid and the polyaminobenzene derivative is considered not to sufficiently proceed, with heating at about 150° C.

Table 7 shows the peel strengths of the negative electrodes of Reference Example 3 and Reference Example 4.

TABLE 7

| | PAA molecular weight | Amine | Step c) Heating temperature, Heating time | Peel strength (N/cm) |
|---|---|---|---|---|
| Reference Example 3 | Polyamide-imide was used | | Performed 200° C., 3 minutes | 0.51 |
| Reference Example 4 | 100000 | None | Performed 200° C., 3 minutes | 0.39 |

Evaluation Example 2

For each of the lithium ion secondary batteries of Example 1 to Example 9, Example 12, Comparative Example 2 and Comparative Example 3, and Reference Example 1 to Reference Example 4, first charging and discharging comprising: charging up to 0.01 V at 0.05C; and subsequent discharging to 1 V, was performed.

Subsequently to the first charging and discharging, a charging and discharging cycle of charging up to 0.01 V at 0.15C and discharging to 1 V, was repeated 19 times.

In accordance with the formulae below, an initial efficiency and a capacity retention rate were calculated. Table 8 shows the results.

Initial efficiency (%)=100×(first discharge capacity)/(first charge capacity)

Capacity retention rate (%)=100×(discharge capacity at last cycle)/(first discharge capacity)

TABLE 8

| | Initial efficiency (%) | Capacity retention rate (%) |
|---|---|---|
| Example 1 | 70.9 | 90.2 |
| Example 2 | 71.1 | 92.2 |
| Example 3 | 71.3 | 94.5 |
| Example 4 | 71.7 | 93.3 |
| Example 5 | 71.1 | 94.7 |
| Example 6 | 71.3 | 93.9 |
| Example 7 | 71.2 | 92.9 |
| Example 8 | 70.9 | 93.5 |
| Example 9 | 70.7 | 92.9 |
| Example 12 | 72.1 | 94.9 |
| Comparative Example 2 | 69.3 | 79.9 |
| Comparative Example 3 | 69.5 | 80.3 |
| Reference Example 1 | 71.5 | 96.6 |
| Reference Example 2 | 71.1 | 93.2 |
| Reference Example 3 | 68.9 | 92.2 |
| Reference Example 4 | 74.8 | 39.9 |

In terms of the initial efficiency, the value of the lithium ion secondary battery of Reference Example 3 using polyamide-imide was the lowest. In terms of the capacity retention rate, the value of the lithium ion secondary battery of Reference Example 4 using polyacrylic acid but not using a polyaminobenzene derivative was the lowest.

The lithium ion secondary batteries of Examples each including the negative electrode of the present invention are each considered to have a suitable initial efficiency and a suitable capacity retention rate.

The excellence of the negative electrode of the present invention not only in terms of the environment and cost but also in terms of performance is considered to be confirmed.

Evaluation Example 3

The viscosities of polyacrylic acid solutions obtained by dissolving polyacrylic acids having various weight-average molecular weights in N-methyl-2-pyrrolidone or water were measured with a viscometer. Table 9 shows the results.

TABLE 9

| Solvent | Weight-average molecular weight of polyacrylic acid | Concentration of polyacrylic acid (mass %) | Viscosity (cP) |
|---|---|---|---|
| NMP | 54000 | 19.5 | 2370 |
| NMP | 107000 | 15.2 | 1700 |
| NMP | 142000 | 13.1 | 2260 |
| NMP | 250000 | 10 | 4000 |

TABLE 9-continued

| Solvent | Weight-average molecular weight of polyacrylic acid | Concentration of polyacrylic acid (mass %) | Viscosity (cP) |
|---|---|---|---|
| water | 5000 | 40 | 100 |
| water | 50000 | 40 | 1500 |
| water | 100000 | 35 | 1000 |
| water | 194000 | 30 | 1050 |
| water | 239000 | 30.3 | 3450 |
| water | 424000 | 29.8 | 10600 |
| water | 800000 | 20 | 30000 |

That increase in the concentration of a polymer in a solution causes increase in the viscosity of the solution as well is common technical knowledge. That, in the case of a polymer solution having the same concentration, a greater average molecular weight of a polymer causes a greater viscosity of the solution as well, is also common technical knowledge.

With reference to the results shown in Table 9 in consideration of such common technical knowledge, the viscosity of the solution obtained by dissolving polyacrylic acid in water is clearly lower than the viscosity of the solution obtained by dissolving polyacrylic acid in N-methyl-2-pyrrolidone.

When the viscosity of the negative-electrode-active-material-layer forming composition to be used in production of a negative electrode is too high, possible occurrence of trouble in production is considered to be obvious. Then, the viscosity of the negative-electrode-active-material-layer forming composition to be used in production of a negative electrode needs to be in a certain range.

Although such a restriction exists, when water is used as the solvent for the negative-electrode-active-material-layer forming composition, the viscosity of the polyacrylic acid solution is suppressed to be at a relatively low level. Thus, adoption of a polyacrylic acid having a greater average molecular weight and adoption of a polyacrylic acid solution in which the polyacrylic acid is dissolved at a higher concentration are realized. Also in regard with these, the method for producing the negative electrode of the present invention using water as the solvent is considered to be excellent.

Example 13

A negative electrode and a lithium ion secondary battery of Example 13 were produced using a method similar to that in Example 5 except that, in step c), the output of light having a wavelength of 6 μm was set such that the temperature of the irradiation unit was 230° C.

Comparative Example 4

A negative electrode and a lithium ion secondary battery of Comparative Example 4 were produced using a method similar to that in Example 5 except that the following heating step was performed as step c).
Heating Step:
A negative electrode precursor wound in a roll shape was set in a vacuum heating oven, and was heated at 120° C. for 8 hours in a reduced pressure atmosphere, whereby a negative electrode of Comparative Example 4 was produced.

Comparative Example 5

A negative electrode and a lithium ion secondary battery of Comparative Example 5 were produced using a method similar to that in Example 5 except that the following heating step was performed as step c).
Heating Step:
A negative electrode precursor wound in a roll shape was set in a vacuum heating oven, and was heated at 150° C. for 8 hours in a reduced pressure atmosphere, whereby a negative electrode of Comparative Example 5 was produced.

Table 10 shows a list of the negative electrodes of Example 5, Example 13, Comparative Example 4, and Comparative Example 5.

TABLE 10

| | Solvent | PAA Composition | PAA molecular weight | Amine | Mole ratio | Light application Heating temperature, Heating time |
|---|---|---|---|---|---|---|
| Example 5 | water | 84/5/10/1 | 800000 | 3,5-diaminobenzoic acid | 16:1 | Performed 200° C., 3 minutes |
| Example 13 | water | 84/5/10/1 | 800000 | 3,5-diaminobenzoic acid | 16:1 | Performed 230° C., 3 minutes |
| Comparative Example 4 | water | 84/5/10/1 | 800000 | 3,5-diaminobenzoic acid | 16:1 | Not performed 120° C., 8 hours |
| Comparative Example 5 | water | 84/5/10/1 | 800000 | 3,5-diaminobenzoic acid | 16:1 | Not performed 150° C., 8 hours |

Evaluation Example 4

With respect to the lithium ion secondary batteries of Example 13, Comparative Example 4, and Comparative Example 5, tests were performed using a method similar to that in Evaluation Example 2. Table 11 shows the test results, together with the result of Example 5.

TABLE 11

| | Light application Heating temperature, Heating time | Initial efficiency (%) | Capacity retention rate (%) |
|---|---|---|---|
| Example 5 | Performed 200° C., 3 minutes | 71.1 | 94.7 |
| Example 13 | Performed 230° C., 3 minutes | 71.4 | 94.8 |
| Comparative Example 4 | Not performed 120° C., 8 hours | 69.4 | 80.3 |
| Comparative Example 5 | Not performed 150° C., 8 hours | 69.4 | 81.2 |

From Table 11, the heating temperature in step c) in the method for producing the negative electrode of the present invention is considered to influence characteristics of the negative electrode.

Evaluation Example 5

The relationship between change in the chemical structure and the heating temperature in step c) in the method for producing the negative electrode of the present invention was analyzed as follows, in consideration of the test results of the negative electrodes of Example 3, Example 12, Comparative Example 2, and Comparative Example 3 each using p-phenylenediamine, and the test results of the negative electrodes of Example 5, Example 13, Comparative Example 4, and Comparative Example 5 each using 3,5-diaminobenzoic acid.

$CaF_2$ was grounded in a mortar and was subjected to pressure forming to have a diameter of 10 mm, whereby $CaF_2$ pellets were obtained. In a glove box purged with argon, the solution of Example 3 or the solution of Example 5 was dropped on a $CaF_2$ pellet, and the resultant matter was dried in the glove box, and then subjected to analysis in a thermal scanning-infrared spectrometry device.

The measurement condition is described in the next paragraph.

Using, as a control, an infrared absorption spectrum of a $CaF_2$ pellet obtained through the same procedure, absorbance of the infrared absorption spectrum of each sample was calculated.

<Apparatus Used>

Fourier transform infrared spectrophotometer Avatar 360 (manufactured by Nicolet), multimode cell (manufactured by ST Japan INC.)

<Measurement Condition>

Under flow of helium, resolution: 4 $cm^{-1}$, number of times of integration: 512 times, wave number range: 4000 to 400 $cm^{-1}$ (detector: MCT), window material: KBr (infrared transmission lower limit: 450 $cm^{-1}$), measurement temperature: room temperature (30° C.), 100° C., 150° C., 180° C., 200° C., 200° C. after 2 hours, 260° C.

Figure 2:
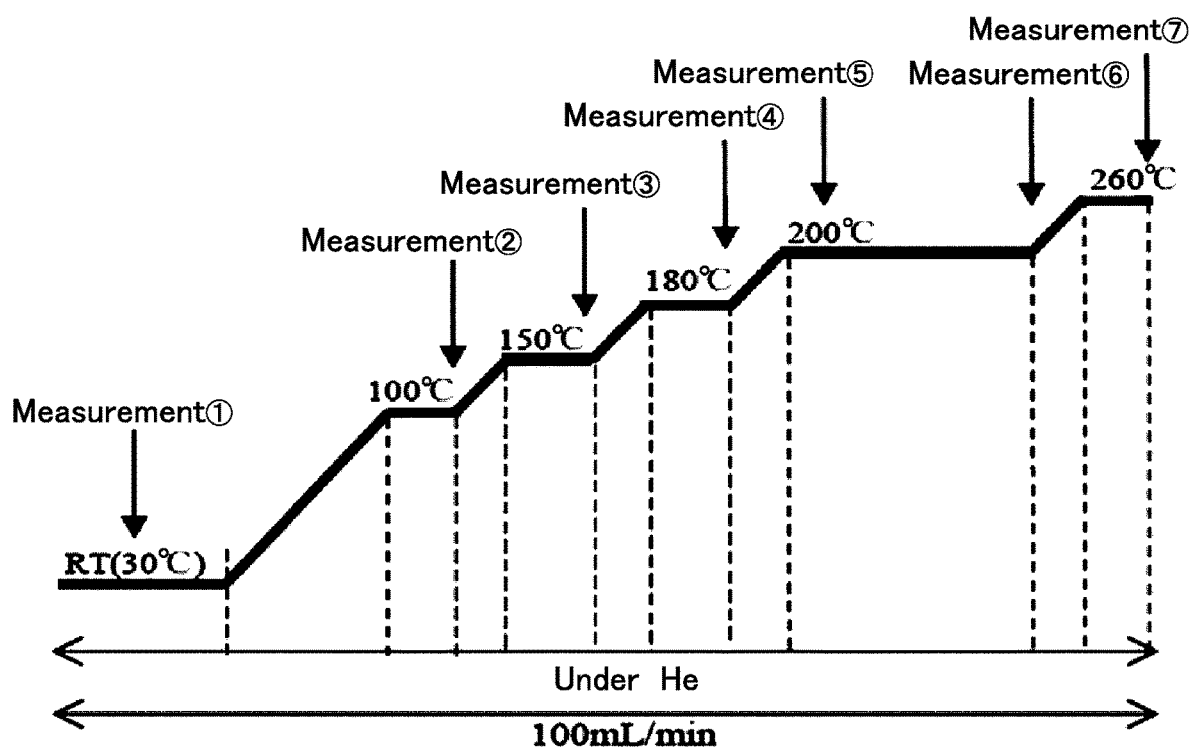
FIG. 2 shows a temperature increase program for Evaluation Example 5.

The temperature increase program is as shown in FIG. 2.

Figure 3:
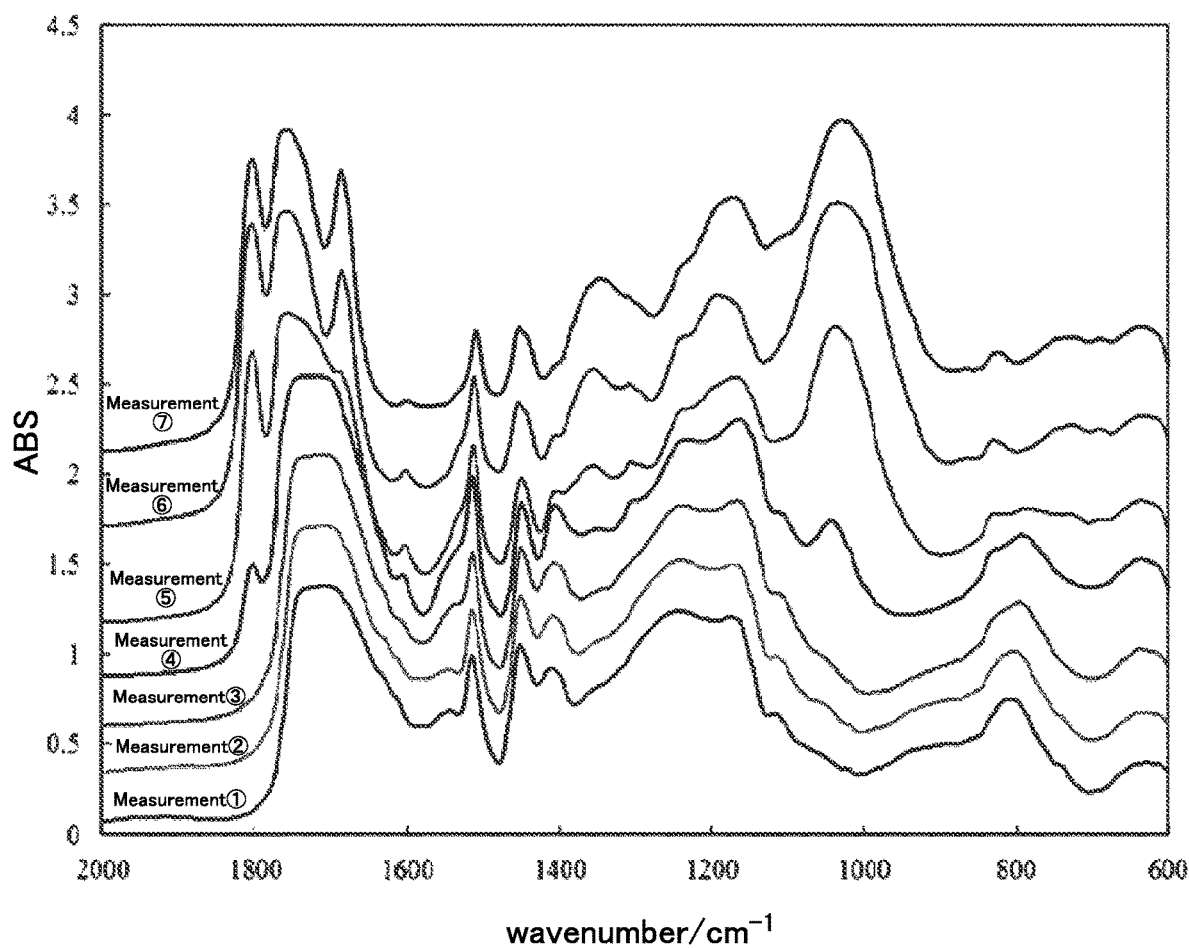
FIG. 3 shows infrared absorption spectra of a sample using a solution of Example 3 in Evaluation Example 5.

FIG. 3 shows infrared absorption spectra of a sample using the solution of Example 3.

Based on the infrared absorption spectra of the sample using the solution of Example 3, the following findings were obtained.

(1) A peak (near 1805 $cm^{-1}$) considered to be derived from the C=O bond of the acid anhydride formed through dehydration condensation of carboxyl groups and a peak (near 1030 $cm^{-1}$) considered to be derived from the C—O bond of the acid anhydride are not observed at 150° C. or lower, and are observed, under heating exceeding 150° C. or under heating at 180° C. or higher. The peak intensity thereof increases in association with increase in the heating temperature.

(2) A peak (near 1685 $cm^{-1}$) considered to be derived from the C=O bond of the six-membered cyclic imide structure formed through dehydration condensation of an amino group and two carboxyl groups of polyacrylic acid is not observed at 180° C. or lower, and is observed, under heating exceeding 180° C. and under heating at 200° C. or higher. The peak intensity thereof increases in association with increase in the heating temperature.

(3) Three peaks (near 1805 $cm^{-1}$, near 1757 $cm^{-1}$, and near 1685 $cm^{-1}$) considered to be derived from the C=O bond are clearly observed, under heating exceeding 180° C. and under heating at 200° C. or higher.

Figure 4:
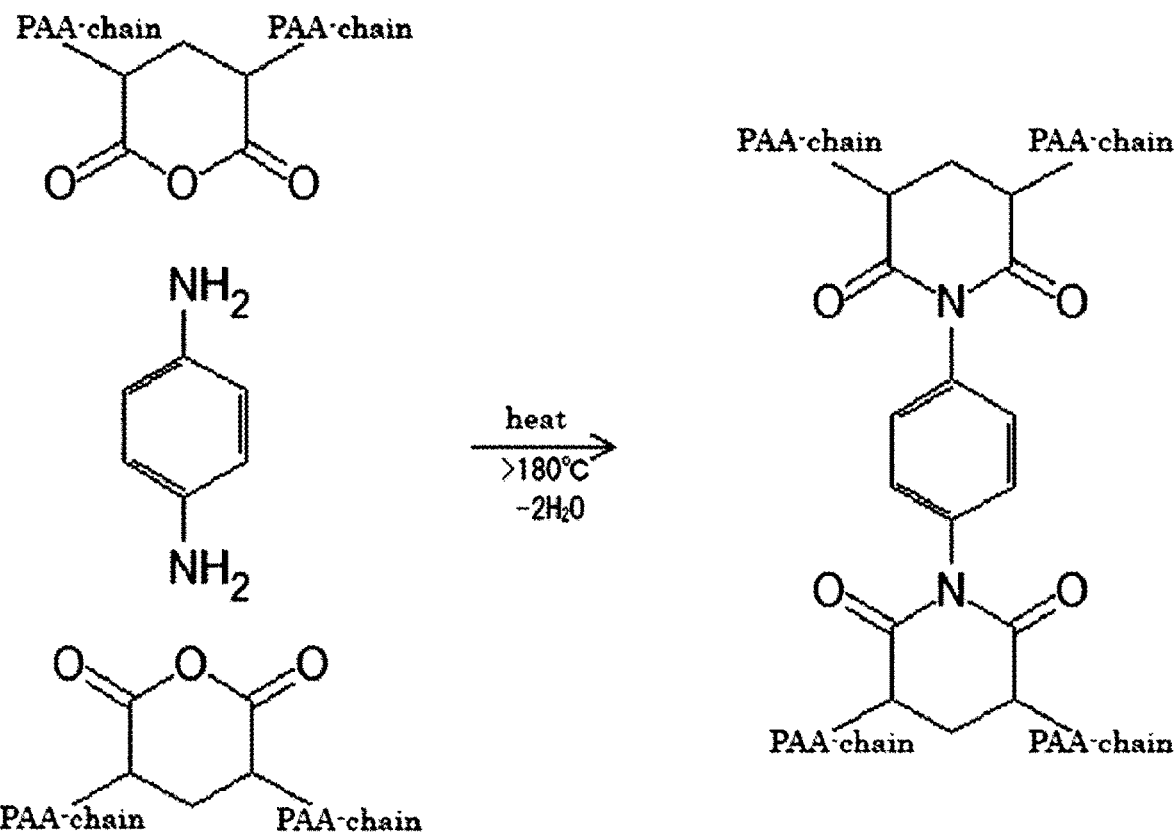
FIG. 4 shows reaction formulae estimated in dehydration-condensation reaction in which chains of polyacrylic acid are crosslinked with p-phenylenediamine.

Based on the findings above, dehydration-condensation reaction in which chains of polyacrylic acid are crosslinked with p-phenylenediamine in the solution of Example 3 is considered to proceed in accordance with the mechanism shown in FIG. 4. In the mechanism, first, carboxyl groups of polyacrylic acid undergo dehydration condensation to form a six-membered cyclic acid anhydride structure (see Scheme 1), and next, the amino group of p-phenylenediamine performs nucleophilic attack on the six-membered cyclic acid anhydride structure, to form a six-membered cyclic imide structure (see Scheme 2).

In the chemical structures in FIG. 4, the PAA-chain means the other portion of the chain of polyacrylic acid.

Figure 5:
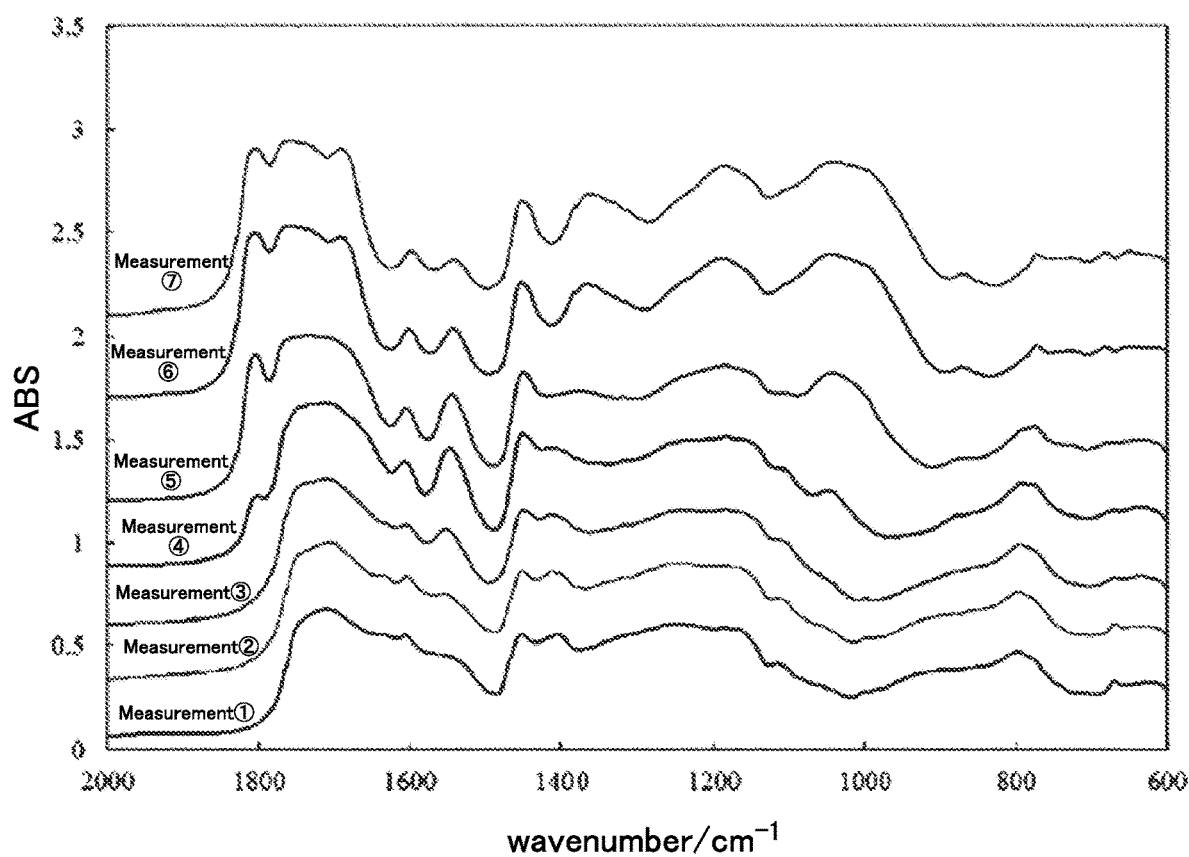
FIG. 5 shows infrared absorption spectra of a sample using a solution of Example 5 in Evaluation Example 5.

FIG. 5 shows infrared absorption spectra of a sample using the solution of Example 5.

Based on the infrared absorption spectra of the sample using the solution of Example 5, the following findings were obtained.

(1) A peak (near 1803 $cm^{-1}$) considered to be derived from the C=O bond of the acid anhydride formed through dehydration condensation of carboxyl groups, and a peak (near 1040 $cm^{-1}$) considered to be derived from the C—O bond of the acid anhydride are not observed at 150° C. or lower, and are observed, under heating exceeding 150° C. or under heating at 180° C. or higher. The peak intensity thereof increases in association with increase in the heating temperature.

(2) A peak (near 1689 $cm^{-1}$) considered to be derived from the C=O bond of the six-membered cyclic imide structure formed through dehydration condensation of an amino group and two carboxyl groups of polyacrylic acid is not observed at 180° C. or lower, and observed, under heating exceeding 180° C. and under heating at 200° C. or higher. The peak intensity thereof increases in association with increase in the heating temperature.

(3) Three peaks (near 1803 $cm^{-1}$, near 1759 $cm^{-1}$, and near 1689 $cm^{-1}$) considered to be derived from the C=O bond are clearly observed, under heating at 200° C. or higher.

(4) A peak (near 1547 $cm^{-1}$) considered to be derived from the CONH structure is clearly observed, under heating exceeding 30° C. or under heating at 100° C. or higher, the peak intensity thereof increases in association with increase in the heating temperature up to 180° C., and the relative peak intensity exhibits a decreasing tendency in association with increase in the heating temperature at 200° C. or higher.

Among the above findings about the solution of Example 5 using 3,5-diaminobenzoic acid, (1) to (3) were similar to the findings about the solution of Example 3 using p-phenylenediamine. However, with respect to the solution of Example 5, the finding (4) is present.

Figure 6:
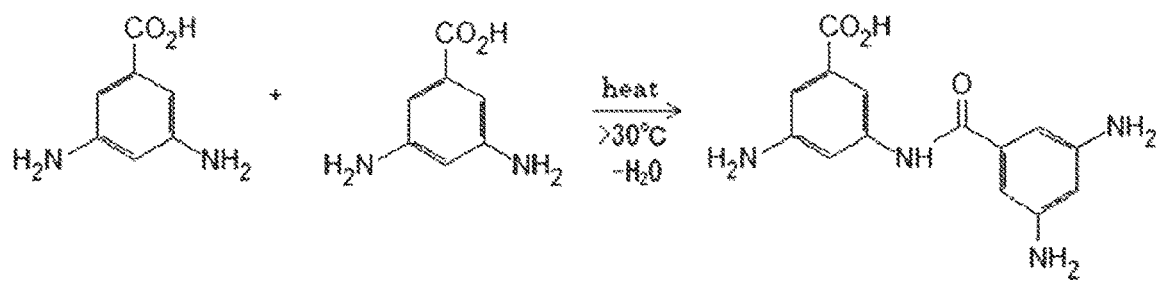
FIG. 6 shows reaction formulae estimated in dehydration-condensation reaction in which chains of polyacrylic acid are crosslinked with a self-condensation product of 3,5-diaminobenzoic acid.
Figure 6:
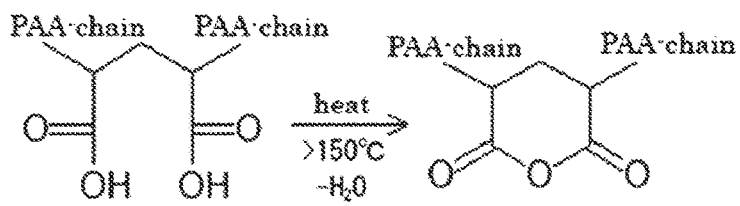
Figure 6:
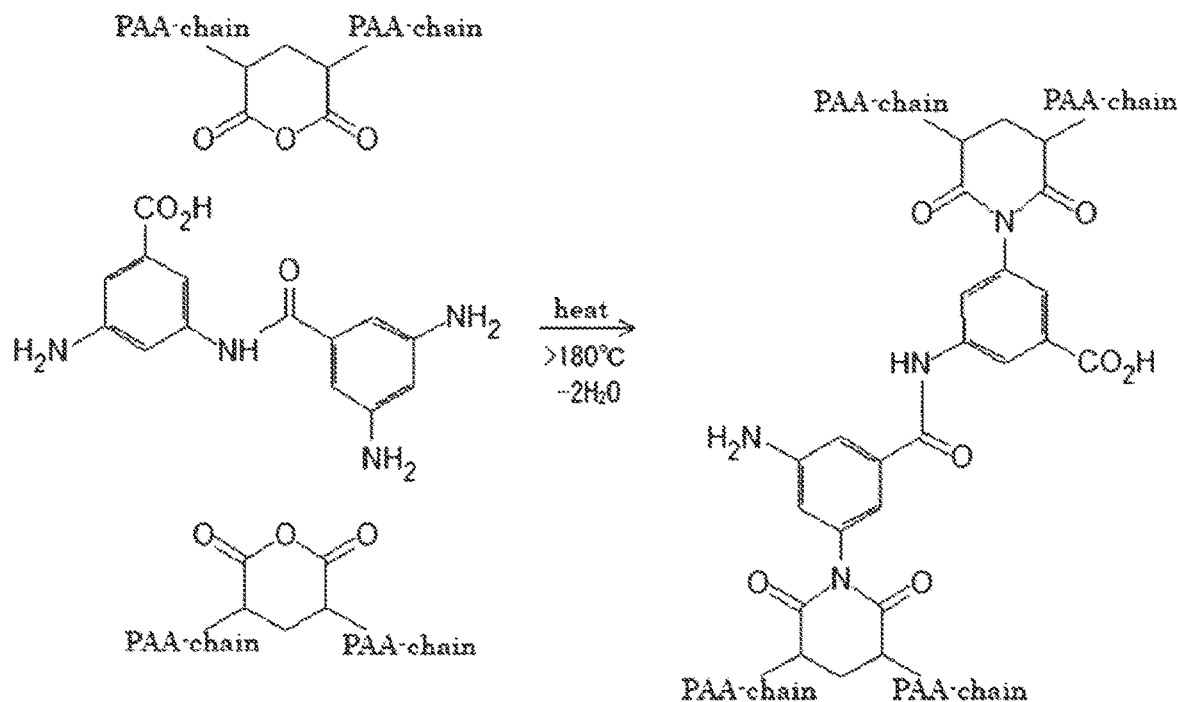

Based on the findings above, in the solution of Example 5 using 3,5-diaminobenzoic acid, the dehydration-condensation reaction in which chains of polyacrylic acid are crosslinked is considered to proceed in accordance with the mechanism shown in FIG. 6. In the mechanism, first, 3,5-diaminobenzoic acids undergo self-condensation (see Scheme 3). Here, in the self-condensation product of 3,5-diaminobenzoic acids, a CONH structure is present. Next, carboxyl groups of polyacrylic acid undergo dehydration condensation to form a six-membered cyclic acid anhydride structure (see Scheme 4), then, an amino group of the self-condensation product of 3,5-diaminobenzoic acid performs nucleophilic attack on the six-membered cyclic acid anhydride structure, to form a six-membered cyclic imide structure (see Scheme 5).

Evaluation Example 6

In a glove box purged with argon, the solution of Example 5 using 3,5-diaminobenzoic acid was dropped to a petri dish and dried to obtain a dried body thereof. Then, the dried body was heated under the following conditions, to form a film.

\<Condition 1\> Under a reduced pressure condition using a vacuum heating oven, 150° C., for 30 minutes.

\<Condition 2\> Under a reduced pressure condition using a vacuum heating oven, 150° C., for 6 hours.

\<Condition 3\> Under a reduced pressure condition using a vacuum heating oven, 180° C., for 30 minutes.

\<Condition 4\> Under a reduced pressure condition using a vacuum heating oven, 230° C., for 30 minutes.

The dried body before being heated, and the films of \<Condition 1\> to \<Condition 4\> were subjected to analyses by an infrared spectrophotometer.

Figure 7:
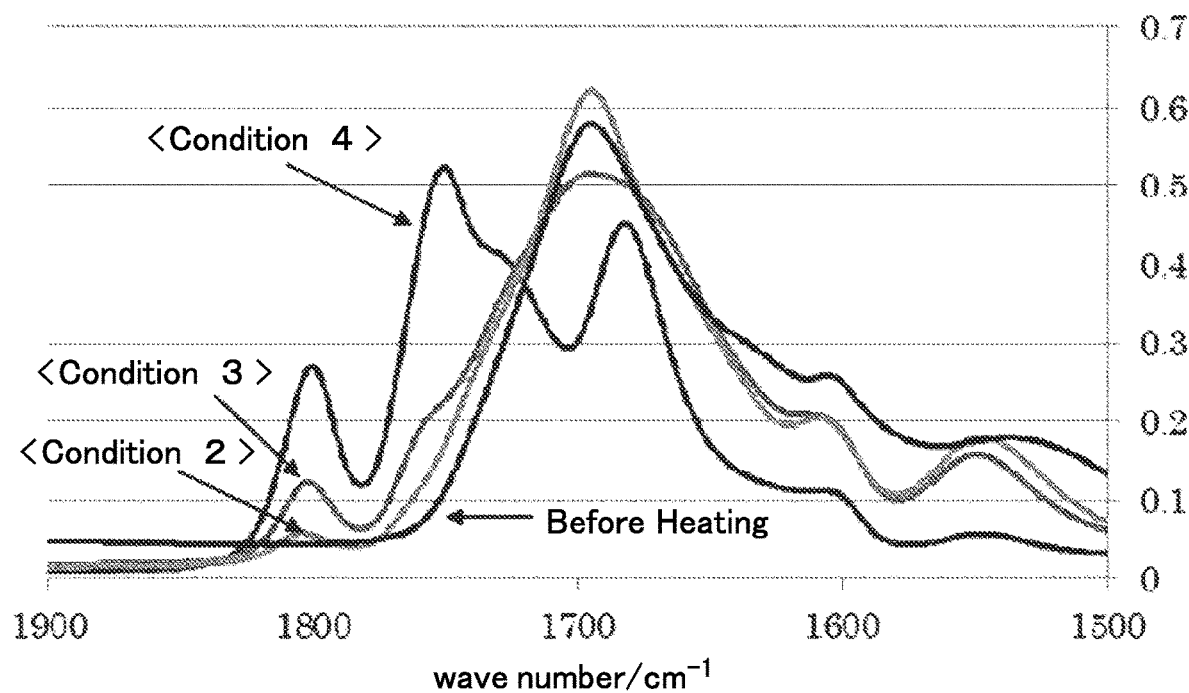
FIG. 7 shows infrared absorption spectra of a dried body before being heated and films of <Condition 2> to <Condition 4> in Evaluation Example 6.

The infrared absorption spectrum of the film of \<Condition 1\> and the infrared absorption spectrum of the film of \<Condition 2\> were equivalent to each other. FIG. 7 shows infrared absorption spectra of the dried body before being heated, and the films of \<Condition 2\> to \<Condition 4\>.

With reference to FIG. 7, the intensity of a peak that is considered to be derived from the C=O bond of the acid anhydride, and in which the peak top is present between 1785 and 1820 cm$^{-1}$, is understood to increase in association with increase in the heating temperature.

A peak in which the peak top is present between 1670 and 1710 cm$^{-1}$ and a peak in which the peak top is present between 1740 and 1780 cm$^{-1}$, the peaks being considered to be derived from the C=O bond, were clearly observed in the film of \<Condition 4\>. These two peaks are, obviously, not observed in the film of \<Condition 3\>, and thus, these two peaks are considered to be generated under a heating condition exceeding 180° C. That is, the chemical structure of the film produced at a heating temperature of 180° C. or lower, and the chemical structure of the film produced at a heating temperature exceeding 180° C. are considered to be clearly different from each other.

The invention claimed is:

1. A method for producing a negative electrode, the negative electrode comprising:
    a compound obtained through condensation of polyacrylic acid and a polyaminobenzene derivative represented by formula (1) below and/or a self-condensation product of the polyaminobenzene derivative;
    a cellulose derivative; and
    a negative electrode active material,

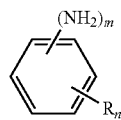

(1)

wherein, in formula (1), R is each independently selected from alkyl optionally substituted with a substituent group, alkoxy, halogen, OH, SH, $NO_2$, CN, $CO_2H$, $SO_3H$, or $CONH_2$, and
m is an integer from 2 to 6, n is an integer from 0 to 4, and m+n≤6; and
wherein the compound contains a six-membered cyclic imide structure,
the method for producing the negative electrode comprising the steps of:
a) preparing a negative-electrode-active-material-layer forming composition containing a precursor of the compound obtained through condensation of the polyacrylic acid and the polyaminobenzene derivative and/or the self-condensation product of the polyaminobenzene derivative, the cellulose derivative, the negative electrode active material, and water, or a negative-electrode-active-material-layer forming composition containing the polyacrylic acid, the polyaminobenzene derivative and/or the self-condensation product of the polyaminobenzene derivative, the cellulose derivative, the negative electrode active material, and water;
b) applying the negative-electrode-active-material-layer forming composition on a current collector to produce a negative electrode precursor; and
c) heating the negative electrode precursor to cause condensation reaction between the polyacrylic acid and the polyaminobenzene derivative and/or the self-condensation product of the polyaminobenzene derivative to proceed,
wherein in the step c), light having a wavelength of 4 to 8 μm is applied to the negative electrode precursor.

2. The method for producing the negative electrode according to claim 1, wherein
    a mole ratio between an acrylic acid monomer unit forming the polyacrylic acid and the polyaminobenzene derivative is in a range of 2:1 to 50:1.

3. The method for producing the negative electrode according to claim 1, wherein
    a weight-average molecular weight of the polyacrylic acid is in a range of 400000 to 2000000.

4. The method for producing the negative electrode according to claim 1, wherein
    the negative electrode active material is an Si-containing negative electrode active material.

5. The method for producing the negative electrode according to claim 1, wherein
    the step c) is a step of using an apparatus including a roll unwinding unit configured to send out a negative electrode precursor in a roll shape, a roll winding unit by which a negative electrode is wound in a roll shape, and an irradiation unit disposed between the roll unwinding unit and the roll winding unit and configured to apply light having a wavelength of 4 to 8 μm.

6. The method for producing the negative electrode according to claim 1, wherein
    with respect to the polyaminobenzene derivative in the self-condensation product of the polyaminobenzene derivative, in the general formula (1), R is each independently selected from $CO_2H$ or $SO_3H$, m is an integer from 2 to 5, n is an integer from 1 to 4, and m+n≤6.

\* \* \* \* \*